(12) United States Patent
Elshafie et al.

(10) Patent No.: US 12,532,308 B2
(45) Date of Patent: Jan. 20, 2026

(54) SLOT FORMATS AND TRANSMISSION TYPES FOR ENERGY HARVESTING-CAPABLE DEVICES

(71) Applicant: QUALCOMM Incorporated, San Diego, CA (US)

(72) Inventors: Ahmed Elshafie, San Diego, CA (US); Huilin Xu, Temecula, CA (US); Linhai He, San Diego, CA (US); Wei Yang, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 18/308,391

(22) Filed: Apr. 27, 2023

(65) Prior Publication Data

US 2024/0365305 A1    Oct. 31, 2024

(51) Int. Cl.
*H04W 72/12* (2023.01)
*H04W 72/20* (2023.01)

(52) U.S. Cl.
CPC .......... *H04W 72/12* (2013.01); *H04W 72/20* (2023.01)

(58) Field of Classification Search
CPC ..... H04W 72/12; H04W 72/20; H04W 88/06; H04W 52/0212; H04W 72/51;
(Continued)

(56) References Cited

U.S. PATENT DOCUMENTS

2022/0167266 A1* 5/2022 Nimbalker ............ H04W 72/20
2022/0312315 A1* 9/2022 Xu ........................ H02J 50/20
(Continued)

FOREIGN PATENT DOCUMENTS

WO    WO 2023283931    *    1/2023
WO    WO-2023283931 A1    1/2023

OTHER PUBLICATIONS

3GPP TS 38.213: "3rd Generation Partnership Project, Technical Specification Group Radio Access Network, NR, Physical Layer Procedures for Control (Release 17)", 3GPP Standard, Technical Specification, 3GPP TS 38.213, 3rd Generation Partnership Project, Mobile Competence Centre, 650, Route Des Lucioles, F-06921 Sophia-Antipolis Cedex, France, vol. RAN WG1, No. V17.5.0, Mar. 30, 2023, pp. 1-262, XP052284509, p. 188.
(Continued)

*Primary Examiner* — Abdullahi E Salad
(74) *Attorney, Agent, or Firm* — Paul M. McAdams; Holland & Hart LLP

(57) ABSTRACT

Methods, systems, and devices for wireless communications are described. Energy harvesting (EH)-capable devices may harvest energy from different sources, such as a radio frequency sources or environmental conditions such as solar energy. The consumed energy by the EH-capable device may be dependent on a task type and the properties of the EH-capable device. Processing of data symbols, demodulation reference signal symbols, and control symbols may involve different energy costs at the EH-capable device. An EH-capable device configured with multiple slot formats may report to the network the immediate energy status and capabilities of the EH-capable device and/or respective energy costs for the EH-capable device for each of the slot formats. The network may schedule communications involving the EH-capable device (e.g., sidelink communications, uplink communications, or downlink communica-
(Continued)

tions) based on the energy costs for the EH-capable device for the multiple slot formats and/or the energy status of the EH-capable device.

26 Claims, 15 Drawing Sheets

(58) Field of Classification Search
CPC .. H02J 50/40; H02J 50/80; H02J 50/20; H02J 50/001; Y02D 30/70
See application file for complete search history.

(56) References Cited

U.S. PATENT DOCUMENTS

| | | | | |
|---|---|---|---|---|
| 2023/0098241 A1* | 3/2023 | Abotabl | ............ | H04W 72/0473 370/311 |
| 2024/0186824 A1* | 6/2024 | Manolakos | ............. | H02J 50/20 |
| 2024/0224246 A1* | 7/2024 | Zhang | .................. | H04L 5/0094 |
| 2024/0235277 A1* | 7/2024 | Elshafie | .................. | H02J 50/80 |
| 2024/0258833 A1* | 8/2024 | Sun | ......................... | H02J 50/20 |
| 2024/0305132 A1* | 9/2024 | Elshafie | ................ | H04W 24/08 |

OTHER PUBLICATIONS

3GPP TS 38.331: "3rd Generation Partnership Project; Technical Specification Group Radio Access Network, NR, Radio Resource Control (RRC) Protocol Specification (Release 17)", 3GPP Standard, Technical Specification, 3GPP TS 38.331, 3rd Generation Partnership Project, Mobile Competence Centre, 650, Route Des Lucioles, F-06921 Sophia-Antipolis Cedex, France, vol. RAN WG2, No. V17.4.0, Mar. 30, 2023, XP052284527, pp. 1-1321, pp. 1-1324, pp. 876-879.
International Search Report and Written Opinion—PCT/US2024/025276—ISA/EPO—Jul. 24, 2024.

* cited by examiner

SLOT FORMATS AND TRANSMISSION TYPES FOR ENERGY HARVESTING-CAPABLE DEVICES

INTRODUCTION

The following relates to wireless communications that pertain to slot formats and transmission types for energy harvesting-capable devices.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support different slot formats and transmission types for energy harvesting (EH)-capable devices. For example, the described techniques provide for consideration of energy costs of different slot formats when scheduling communications for an EH-capable device. EH-capable devices may harvest energy from different sources, such as a dedicated radio frequency (RF) source, an ambient RF source, or environmental conditions such as solar energy. The consumed energy by the EH-capable device may be dependent on a wireless communication task and the properties of the EH-capable device. Different tasks may use different amounts of power. For example, processing of data symbols, demodulation reference signal (DMRS) symbols, and control symbols may involve different amounts of power at the EH-capable device. Accordingly, an EH-capable device configured with multiple slot formats may report to the network (e.g., a serving network entity) the immediate energy status and capabilities of the EH-capable device and/or respective energy costs for the EH-capable device for each of the multiple slot formats. The network may schedule communications involving the EH-capable device (e.g., sidelink communications, uplink communications, or downlink communications) based on the energy costs for the EH-capable device for the multiple slot formats and/or the energy status of the EH-capable device.

A method for wireless communications at an EH-capable device is described. The method may include receiving, from a first network node, first control information indicative of one or more slot formats which are supported by the first network node for EH-associated communications, transmitting, based on the first control information, second control information to the first network node, where the second control information is indicative of a respective energy cost for the EH-capable device for each respective portion of one or more portions of the one or more slot formats, and receiving, from the first network node, scheduling information that schedules a shared channel transmission between the EH-capable device and one of the first network node or a second network node, where the scheduling information is based on the second control information.

An EH-capable device is described. The EH-capable device may include a memory; and at least one processor coupled to the memory. The at least one processor is configured to receive, from a first network node, first control information indicative of one or more slot formats which are supported by the first network node for EH-associated communications, transmit, based on the first control information, second control information to the first network node, where the second control information is indicative of a respective energy cost for the EH-capable device for each respective portion of one or more portions of the one or more slot formats, and receive, from the first network node, scheduling information that schedules a shared channel transmission between the EH-capable device and one of the first network node or a second network node, where the scheduling information is based on the second control information.

Another apparatus for wireless communications at an EH-capable device is described. The apparatus may include means for receiving, from a first network node, first control information indicative of one or more slot formats which are supported by the first network node for EH-associated communications, means for transmitting, based on the first control information, second control information to the first network node, where the second control information is indicative of a respective energy cost for the EH-capable device for each respective portion of one or more portions of the one or more slot formats, and means for receiving, from the first network node, scheduling information that schedules a shared channel transmission between the EH-capable device and one of the first network node or a second network node, where the scheduling information is based on the second control information.

A non-transitory computer-readable having code for wireless communications stored thereon is described. The code, when executed by an EH-capable device, causes the EH-capable device to receive, from a first network node, first control information indicative of one or more slot formats which are supported by the first network node for EH-associated communications, transmit, based on the first control information, second control information to the first network node, where the second control information is indicative of a respective energy cost for the EH-capable device for each respective portion of one or more portions of the one or more slot formats, and receive, from the first network node, scheduling information that schedules a shared channel transmission between the EH-capable device and one of the first network node or a second network node, where the scheduling information is based on the second control information.

In some examples of the method, EH-capable device, apparatuses, and non-transitory computer-readable medium described herein, the one or more slot formats include a pattern of signal types within a slot or a set of multiple slots.

In some examples of the method, EH-capable device, apparatuses, and non-transitory computer-readable medium described herein, the signal types include one or more control channel types, one or more reference signal types, one or more data channel types, one or more uplink message types, one or more downlink message types, one or more sidelink message types, or combinations thereof.

In some examples of the method, EH-capable device, apparatuses, and non-transitory computer-readable medium described herein, the first control information includes one or more sets of radio resource control (RRC) parameters, each set of RRC parameters of the one or more sets of RRC parameters corresponds to one respective slot format of the one or more slot formats, and each set of RRC parameters of the one or more sets of RRC parameters defines a respective reference allocation block size and a respective resource set for the respective slot format to which the respective set of RRC parameters corresponds.

In some examples of the method, EH-capable device, apparatuses, and non-transitory computer-readable medium described herein, the shared channel transmission may be a downlink transmission or an uplink transmission between the first network node and the EH-capable device.

In some examples of the method, EH-capable device, apparatuses, and non-transitory computer-readable medium described herein, the shared channel transmission may be a sidelink transmission between the second network node and the EH-capable device.

In some examples of the method, EH-capable device, apparatuses, and non-transitory computer-readable medium described herein, the scheduling information includes an indication of a transmission type for the sidelink transmission.

Some examples of the method, EH-capable device, apparatuses, and non-transitory computer-readable medium described herein may further include operations, features, means, or instructions for transmitting, to the first network node, third control information indicative of an identifier or a class identifier of the second network node, where the second network node may be a second EH-capable device and receiving, from the first network node, fourth control information indicative of one or more second slot formats for the second network node for communications with the EH-capable device.

Some examples of the method, EH-capable device, apparatuses, and non-transitory computer-readable medium described herein may further include operations, features, means, or instructions for communicating a second shared channel transmission with the second network node using a particular slot format of one or more second slot formats, where the one or more second slot formats may be for the second network node for EH associated communications, where the second network node may be a second EH-capable device, and where the particular slot format may be based on a second shared channel transmission type that corresponds to an expected communication between the EH-capable device and the second network node.

Some examples of the method, EH-capable device, apparatuses, and non-transitory computer-readable medium described herein may further include operations, features, means, or instructions for receiving, from the second network node, third control information indicative of a respective energy cost for each respective portion of one or more portions of the one or more second slot formats.

Some examples of the method, EH-capable device, apparatuses, and non-transitory computer-readable medium described herein may further include operations, features, means, or instructions for transmitting, to the first network node, fourth control information indicative of the respective energy cost for each respective portion of the one or more portions of the one or more second slot formats and receiving, from the first network node, second scheduling information that schedules the second shared channel transmission between the EH-capable device and the second network node, where the second scheduling information may be based on the fourth control information.

In some examples of the method, EH-capable device, apparatuses, and non-transitory computer-readable medium described herein, communicating the second shared channel transmission may include operations, features, means, or instructions for communicating the second shared channel transmission using one of the one or more second slot formats based on the third control information indicative of the respective energy cost for each respective portion of the one or more portions of the one or more second slot formats.

In some examples of the method, EH-capable device, apparatuses, and non-transitory computer-readable medium described herein, communicating, with the first network node, the shared channel transmission using one of the one or more slot formats based on an energy status of the EH-capable device, a charging rate of the EH-capable device, a discharge rate of the EH-capable device, a battery leakage of the EH-capable device or a combination thereof.

Some examples of the method, EH-capable device, apparatuses, and non-transitory computer-readable medium described herein may further include operations, features, means, or instructions for transmitting, to the first network node, a scheduling request for a second shared channel transmission between the EH-capable device and one of the first network node or the second network node, where the scheduling request may be based on an energy level at the EH-capable device being sufficient for communication of the second shared channel transmission.

Some examples of the method, EH-capable device, apparatuses, and non-transitory computer-readable medium described herein may further include operations, features, means, or instructions for transmitting, to the first network node, third control information indicative of an energy level at the EH-capable device being sufficient for the shared channel transmission, where the scheduling information may be responsive to the third control information.

A method for wireless communications at a first network node is described. The method may include transmitting, to an EH-capable device, first control information indicative of one or more slot formats which are supported by the first network node for EH-associated communications, receiving, based on the first control information, second control information from the EH-capable device, where the second control information is indicative of a respective energy cost for the EH-capable device for each respective portion of one or more portions of the one or more slot formats, and transmitting, to the EH-capable device, scheduling information that schedules a shared channel transmission between the EH-capable device and one of the first network node or a second network node, where the scheduling information is based on the second control information.

A first network node for wireless communications is described. The first network node may include a memory; and at least one processor coupled to the memory. The at least one processor is configured to transmit, to an EH-capable device, first control information indicative of one or more slot formats which are supported by the first network node for EH-associated communications, receive, based on the first control information, second control information from the EH-capable device, where the second control information is indicative of a respective energy cost for the EH-capable device for each respective portion of one or more portions of the one or more slot formats, and transmit, to the EH-capable device, scheduling information that schedules a shared channel transmission between the EH-capable device and one of the first network node or a second network node, where the scheduling information is based on the second control information.

Another apparatus for wireless communications at a first network node is described. The apparatus may include means for transmitting, to an EH-capable device, first control information indicative of one or more slot formats which are supported by the first network node for EH-associated communications, means for receiving, based on the first control information, second control information from the EH-capable device, where the second control information is indicative of a respective energy cost for the EH-capable device for each respective portion of one or more portions of the one or more slot formats, and means for transmitting, to the EH-capable device, scheduling information that schedules a shared channel transmission between the EH-capable device and one of the first network node or a second network node, where the scheduling information is based on the second control information.

A non-transitory computer-readable having code for wireless communications stored thereon is described. The code, when executed by a first network node, causes the first network node to transmit, to an EH-capable device, first control information indicative of one or more slot formats which are supported by the first network node for EH-associated communications, receive, based on the first control information, second control information from the EH-capable device, where the second control information is indicative of a respective energy cost for the EH-capable device for each respective portion of one or more portions of the one or more slot formats, and transmit, to the EH-capable device, scheduling information that schedules a shared channel transmission between the EH-capable device and one of the first network node or a second network node, where the scheduling information is based on the second control information.

In some examples of the method, first network node, apparatuses, and non-transitory computer-readable medium described herein, the one or more slot formats include a pattern of signal types within a slot or a set of multiple slots.

In some examples of the method, first network node, apparatuses, and non-transitory computer-readable medium described herein, the signal types include one or more control channel types, one or more reference signal types, one or more data channel types, one or more uplink message types, one or more downlink message types, one or more sidelink message types, or combinations thereof.

In some examples of the method, first network node, apparatuses, and non-transitory computer-readable medium described herein, the first control information includes one or more sets of RRC parameters, each set of RRC parameters of the one or more sets of RRC parameters corresponds to one respective slot format of the one or more slot formats, and each set of RRC parameters of the one or more sets of RRC parameters defines a respective reference block allocation size and a respective resource set for the respective slot format to which the respective set of RRC parameters corresponds.

In some examples of the method, first network node, apparatuses, and non-transitory computer-readable medium described herein, the shared channel transmission may be a downlink transmission or an uplink transmission between the first network node and the EH-capable device.

In some examples of the method, first network node, apparatuses, and non-transitory computer-readable medium described herein, the shared channel transmission may be a sidelink transmission between the second network node and the EH-capable device.

Some examples of the method, first network node, apparatuses, and non-transitory computer-readable medium described herein may further include operations, features, means, or instructions for receiving, from the EH-capable device, third control information indicative of an identifier or a class identifier of the second network node, where the second network node may be a second EH-capable device and transmitting, to the EH-capable device, fourth control information indicative of one or more second slot formats for the second network node for communications with the EH-capable device.

Some examples of the method, first network node, apparatuses, and non-transitory computer-readable medium described herein may further include operations, features, means, or instructions for receiving, from the EH-capable device, fifth control information indicative of a respective energy cost for the second network node for each respective portion of one or more portions of the one or more second slot formats. Some examples of the method, first network node, apparatuses, and non-transitory computer-readable medium described herein may further include operations, features, means, or instructions for receiving, from the EH-capable device, a scheduling request for a second shared channel transmission between the EH-capable device and one of the first network node or the second network node, where the scheduling request may be based on an energy level at the EH-capable device being sufficient for communication of the second shared channel transmission.

Some examples of the method, first network node, apparatuses, and non-transitory computer-readable medium described herein may further include operations, features, means, or instructions for receive, from the EH-capable device, third control information indicative of an energy level at the EH-capable device being sufficient for the shared channel transmission, where the scheduling information may be responsive to the third control information.

DETAILED DESCRIPTION

Figure 1:
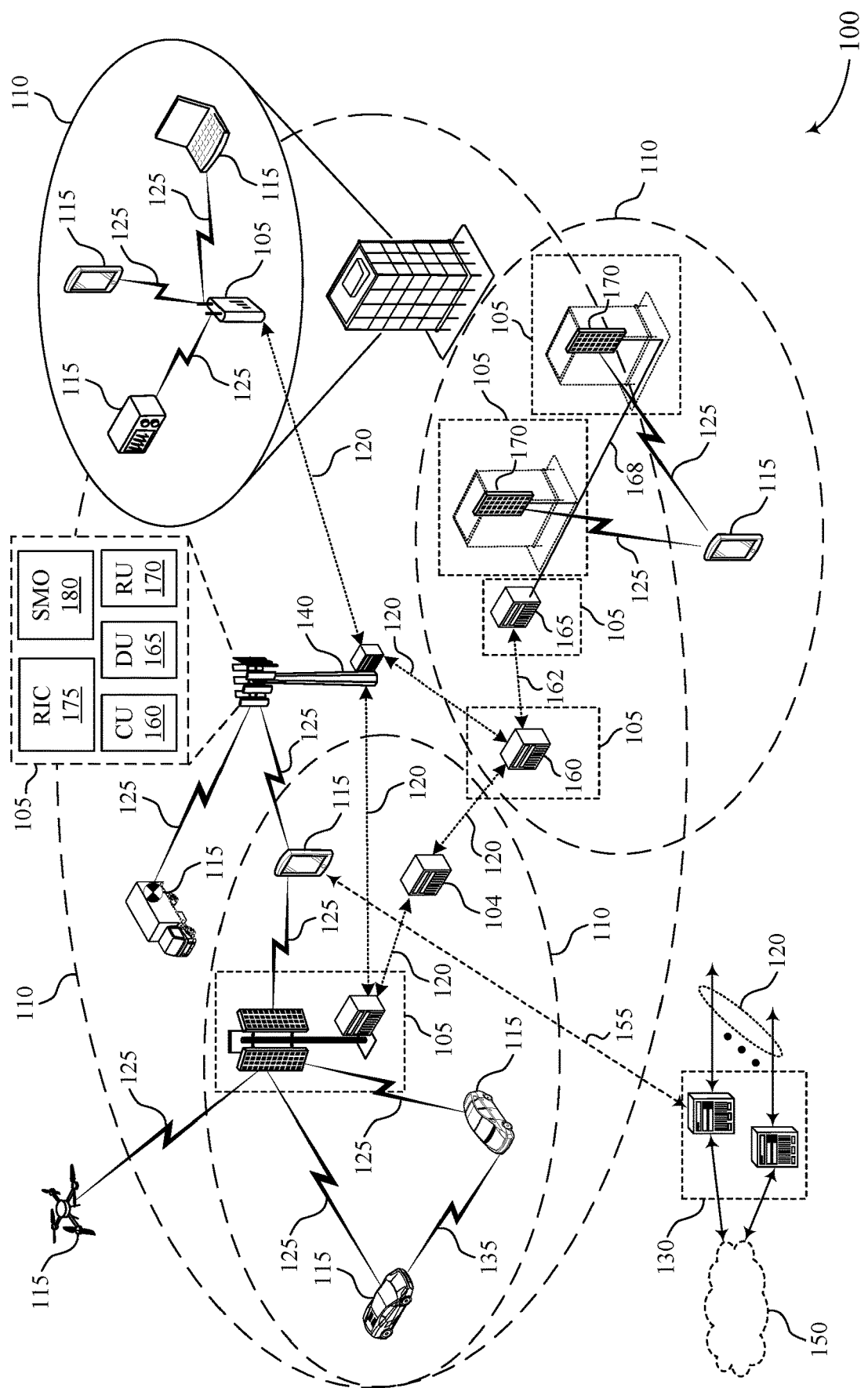
FIG. 1 shows an example of a wireless communications system that supports different slot formats and transmission types for energy harvesting (EH)-capable devices in accordance with one or more aspects of the present disclosure.

Some wireless communications systems may include energy harvesting (EH)-capable devices. EH-capable devices may perform operations such as location tracking and identification. Some EH-capable devices may not have internal power sources, but may receive power from transmissions by other devices. Some EH-capable devices may include a battery or other energy storage device via which energy may be stored. EH-capable devices may harvest energy from different sources, such as a dedicated radio frequency (RF) source, an ambient RF source, or environmental conditions such as solar energy. For an EH-capable device to perform wireless communications and other operations, accumulated energy must be equal to or higher than consumed energy. The consumed energy by the EH-capable device may be dependent on a wireless communication task and the properties of the EH-capable device. Different tasks may use different amounts of power. For example, the EH-capable device may use a first amount of power to process a demodulation reference signal (DMRS), a second amount of power to process a low-density parity-check (LDPC) coded data signal, and a third amount of power to process a polar-coded information signal. Additionally, an EH-capable device may use less power to process a data packet than DMRS or control signals, and the amount of consumed energy may depend on the format of the data packet. Accordingly, different slot formats or different portions of slot formats may be associated with different energy costs for an EH-capable device (e.g., depending on the amount of DMRS symbols, control symbols, and data symbols). If a wireless device, such as a network entity or a user equipment (UE), communicates a shared channel transmission with the EH-capable device, the shared channel transmission may not be received or transmitted by the EH-capable device if the consumed power for the shared channel transmission is greater than the accumulated power at the EH-capable device.

An EH-capable device may be configured with multiple slot formats. The EH-capable device may report back to the network (e.g., a serving network entity) the immediate energy status and capabilities of the EH-capable device. For example, a network entity may transmit, to the EH-capable device, an indication of a set of slot formats for communications involving the EH-capable device. The EH-capable device may transmit, to the network entity, an indication of respective energy costs for the EH-capable device for each of the slot formats, for example, based on the amount of DMRS symbols, control symbols, and data symbols in the slot formats. In some aspects, the EH-capable device may report a respective energy cost for the EH-capable device for each respective portion of one or more portions of the multiple slot formats. For example, the EH-capable device may report the energy costs for DMRS symbols, control symbols, and data symbols.

Based on the energy costs for the slot formats (e.g., the energy cost for the EH-capable device for each respective portion of one or more portions of the multiple slot formats), the network entity may schedule, for the EH-capable device, an uplink transmission or a downlink transmission between the EH-capable device and the network entity using a slot format of the set of slot formats. In some aspects, the network entity may schedule, for the EH-capable device, a sidelink transmission between the EH-capable device and a UE, which may be a second EH-capable device. In some cases, where the UE is a second EH-capable device, the first EH-capable device may receive, from the second EH-capable device, an indication of energy costs for slot formats for the second EH-capable device, and the EH-capable device may further indicate the energy costs for the second EH-capable device to the network.

Aspects of the disclosure are initially described in the context of wireless communications systems. Aspects of the disclosure are further illustrated by and described with reference to slot diagrams, process flows, apparatus diagrams, system diagrams, and flowcharts that relate to slot formats and transmission types for EH-capable devices.

FIG. 1 shows an example of a wireless communications system 100 that supports different slot formats and transmission types for EH-capable devices in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., an RF access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another via a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support different slot formats and transmission types for EH-capable devices as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some aspects, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some aspects, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some aspects, the wireless communications system 100 may include network entities 105 or UEs 115 that support concurrent communications using carriers associated with multiple carrier bandwidths. In some aspects, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other aspects, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some aspects, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some aspects, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some aspects, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data.

Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1: M) system in which each UE 115 transmits to each of the other UEs 115 in the group. In some aspects, a network entity 105 may facilitate the scheduling of resources for D2D communications. In some other aspects, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, in which case the device may provide HARQ feedback in a specific slot for data received via a previous symbol in the slot. In some other aspects, the device may provide HARQ feedback in a subsequent slot, or according to some other time interval.

The wireless communications system 100 may include EH-capable devices (e.g., an EH-capable device may be a UE 115 capable of harvesting energy). EH-capable devices may harvest energy from different sources, such as a dedicated RF source, an ambient RF source, or environmental conditions such as solar energy. Example EH-capable devices include RF identifier (RFID) tags and ambient IoT (AIoT) devices, such as an IoT Pixel device. An IoT Pixel device may be an EH Bluetooth low energy tag that includes a Bluetooth low energy core, is capable of RF EH, has a flash memory (e.g., 2 KB), includes sensors such as a tamper or temperature sensor, operates at 2.4 GHz and/or 800/900 MHz, and has a range of 2-10 m.

The consumed energy by the EH-capable device may be dependent on a wireless communication task and the properties of the EH-capable device. Different tasks may use different amounts of power. For example, processing of data symbols, DMRS symbols, and control symbols may involve different amounts of power at the EH-capable device. Accordingly, an EH-capable device configured with multiple slot formats may report to the network (e.g., a serving network entity) the immediate energy status and capabilities of the EH-capable device and/or respective energy costs for the EH-capable device for each of the multiple slot formats. For example, a network entity 105 may transmit, to the EH-capable device, an indication of a set of slot formats for communications involving the EH-capable device. The EH-capable device may transmit, to the network entity 105, an indication of respective energy costs for the EH-capable device for each of the slot formats, for example, based on the amount of DMRS symbols, control symbols, and data symbols in the slot formats. In some aspects, the EH-capable device may report a respective energy cost for the EH-capable device for each respective portion of one or more portions of the multiple slot formats. For example, the EH-capable device may report the energy costs for DMRS symbols, control symbols, and data symbols.

The network may schedule communications involving the EH-capable device (e.g., sidelink communications, uplink communications, or downlink communications) based on the energy costs for the EH-capable device for the multiple slot formats and/or the energy status of the EH-capable device.

Figure 2:
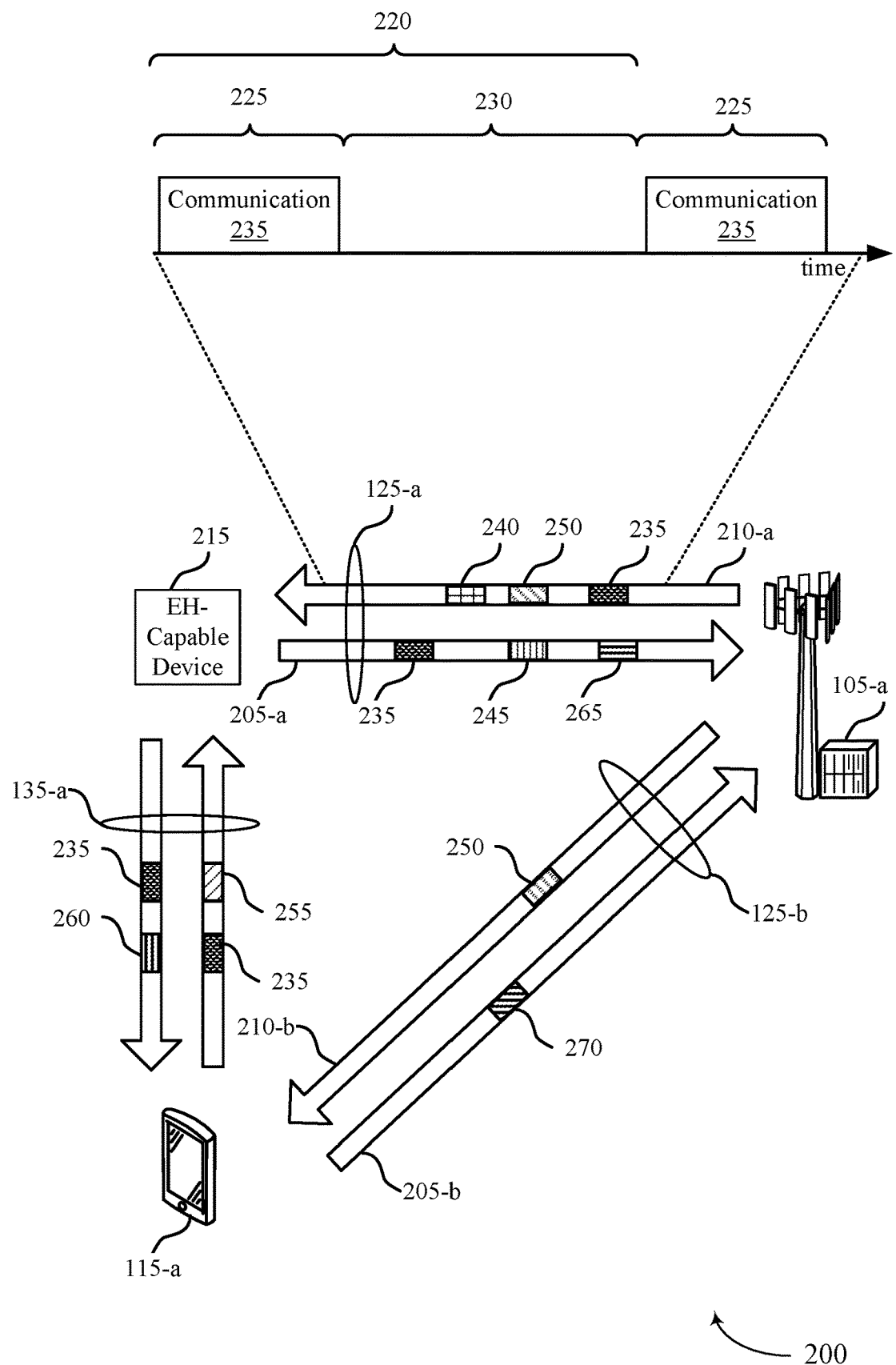
FIG. 2 shows an example of a wireless communications system that supports different slot formats and transmission types for EH-capable devices in accordance with one or more aspects of the present disclosure.

FIG. 2 shows an example of a wireless communications system 200 that supports different slot formats and transmission types for EH-capable devices in accordance with one or more aspects of the present disclosure. The wireless communications system 200 may implement aspects of or may be implemented by aspects of the wireless communications system 100. For example, the wireless communications system 200 includes a UE 115-a, which may be an example of a UE 115 as described herein. The wireless communications system 200 may also include a network entity 105-a, which may be an example of a network entity 105 as described herein. The wireless communications system 200 also includes an EH-capable device 215. In some aspects, the EH-capable device 215 may be a UE 115 that is capable of EH.

The EH-capable device 215 may communicate with the network entity 105-a using a communication link 125-a, and the UE 115-a may communicate with the network entity 105-a using a communication link 125-b. The communication link 125-a may be an example of an NR or LTE link between the EH-capable device 215 and the network entity 105-a. The communication link 125-b may be an example of an NR or LTE link between the UE 115-a and the network entity 105-a. The communication link 125-a and the communication link 125-b may include bi-directional links that enable both uplink and downlink communications. For example, the EH-capable device 215 may transmit uplink signals 205-a (e.g., uplink transmissions), such as uplink control signals or uplink data signals, to the network entity 105-a using the communication link 125-a and the network entity 105-a may transmit downlink signals 210-a (e.g., downlink transmissions), such as downlink control signals or downlink data signals, to the EH-capable device 215 using the communication link 125-a. The UE 115-a may transmit uplink signals 205-b (e.g., uplink transmissions), such as uplink control signals or uplink data signals, to the network entity 105-a using the communication link 125-b and the network entity 105-a may transmit downlink signals 210-b (e.g., downlink transmissions), such as downlink control signals or downlink data signals, to the UE 115-a using the communication link 125-b.

The EH-capable device 215 may communicate with the UE 115-a using a communication link 135-a, which may be an example of a communication link 135 as described herein. For example, the communication link 135-a may be a sidelink communication link and may support bidirectional communications between the EH-capable device 215 and the UE 115-a.

The EH-capable device 215 may harvest energy from different sources, such as a dedicated RF source, an ambient RF source, or environmental conditions such as solar energy. An active cycle 220 for the EH-capable device 215 may be designed based on the input power ($P_x$) to the EH-capable device 215 (e.g., the power harvested by the EH-capable device 215) and the power consumption ($P_y$) of the EH-capable device 215. The active cycle 220 may include an on duration 225 during which the EH-capable device 215 may transmit or receive one or more communications 235 and an EH duration 230 during which the EH-capable device 215 harvests RF energy. For RF energy harvesting, the RF to DC energy conversion efficiency may be represented by $\eta_x$, and the harvested power may be given by $P_x \cdot \eta_x$. The power consumed by the integrated circuit (IC) of the EH-capable device 215 may be represented by $P_y$. For a read duration of Y time units (e.g., the on duration 225 is Y time units), the condition to operate the EH-capable device 215 may be given by $P_x \cdot \eta_x \cdot X \geq P_y \cdot Y$. In order to operate, the accumulated energy at the EH-capable device 215 must be more than the consumed energy. Thus, the duration of the EH duration 230 may be X time units, where $$X \geq \frac{P_y \cdot Y}{P_x \eta_x},$$

with $$\frac{X}{Y} \geq \frac{P_y}{P_x \eta_x}.$$

As described herein, different slot formats (e.g., used for different types of shared channel transmissions) may be associated with different energy costs at the EH-capable device 215. The EH-capable device 215 may communicate using the different slot formats over an NR link/interface such as over the communications link 125-a or the communication link 135-a, over a Bluetooth link (e.g., with another Bluetooth enabled wireless communication device), or over another wireless communication link/interface.

As an example, the EH-capable device 215 may be an IoT device operating at 180 kHz bandwidth with 15 kHz subcarrier spacing (SCS) (equivalent to a 1 ms slot duration with 12 resource elements (180/15), equivalent to 1 RB). Per RB, the power to process a DMRS may be given by $P_{DMRS}$, the power to process an LPDC coded data signal may be given by $P_{data}$, the power to process a polar coded information signal may be given by $P_{control\text{-}polar}$ (e.g., physical downlink control channel (PDCCH) conveying a polar coded downlink control information (DCI)), and the power to process a sequence based control may be given by $P_{control\text{-}seq}$. The energy costs ($P_{DMRS}$, $P_{data}$, $P_{control\text{-}polar}$, $P_{control\text{-}seq}$) may be signaled to the network entity 105-a. In some aspects, $P_{data}$ may be extended to be per modulation and coding scheme (MCS). For example, $P_{data}$ may be a function of the coding rate, modulation order, or both. In some aspects, the MCS impact on the energy cost may be less significant that the type of LPDC decoder at the EH-capable device 215.

As described with reference to FIG. 3, an uplink or downlink slot may include X PDCCH symbols, Y DMRS symbols, and Z data symbols. Accordingly, the power to process such an uplink or downlink slot is given by $P_{slot}=X\times P_{control\text{-}polar}+Y\times P_{DMRS}+Z\times P_{data}$. The energy storage at the EH-capable device 215 may be given by $E_{stored}=P_{slot}\times T\times \beta$, where β is scaling factor greater than one to indicate the number of energy units of size $P_{slot}$, and T is the amount of slots. By indicating X, Y, and Z and $P_{DMRS}$, $P_{data}$, $P_{control\text{-}polar}$, the network entity 105-a and the EH-capable device 215 may both be aware of the energy cost per slot at the EH-capable device 215. Then by indicating the battery size of the EH-capable device 215 (e.g., in capability signaling), the network entity 105-a may determine β. The network entity 105-a may design X, Y, and Z such that β is at least 1.

Assuming a battery leakage (due to battery imperfection or aging) is given by $d_{leakage}$ dB per OFDM symbol duration (or normalized per RB) and assuming a discharge rate of $d_{discharge}$ dB per OFDM symbol duration (or normalized per RB), where the discharging rate may be related to monitoring of wake-up/DCI signals or engaging in processing other tasks (e.g., memory access, I/Q sample retrieval, or clock power consumption), then the average power loss per OFDM symbol duration may be given by $d_{leakage}+d_{discharge}$ dB. If β is 1, then some OFDM symbols may be lost if leakage is notable.

The EH-capable device 215 may indicate to the network entity 105-a, on an RB or resource element (RE) level or per time/frequency block basis, the cost of: one reference signal type 1 processing (e.g., DMRS); one reference signal type 2 processing (e.g., synchronization signal block (SSB)); one reference signal type 3 processing (e.g., channel state information reference signal (CSI-RS), which may be a function of the quantity of CSI-RS ports if multi-port CSI-RS is supported by the device); uplink/downlink data processing (in some aspects, parameterized per MCS or modulation order of an MCS); PDCCH processing (which may depend on DCI formats which have different bit sizes); physical uplink control channel (PUCCH) processing (e.g., encoding and preparation which could depend on the format which may have different waveforms, different DMRS/data structures, and different encoding procedures); not monitoring any signal (e.g., the cost of detecting no DCI based on PDCCH DMRS); battery leakage $d_{leakage}$ in dB/RB or any other unit such as mJ. The EH-capable device 215 may also indicate to the network entity 105-a the battery size of the EH-capable device 215 in terms of a given reference. In some aspects, battery size may be indicated as a class of UE of the EH-capable device 215. For uplink signaling, the transmit power may be managed by the network entity 105-a based on power control commands.

Different types of slot formats may be configured for the EH-capable device 215. For example, the network entity 105-a may transmit control information 240 indicative of one or more slot formats which are supported by the network entity 105-a for EH-associated communications. In some aspects, the one or more slot formats may be standardized or predefined. In some aspects, the network entity 105-a may select and indicate the one or more slot formats based on an EH class of the EH-capable device 215 during initial access or through RRC signaling. The one or more slot formats may correspond to different physical downlink shared channel (PDSCH), physical uplink shared channel (PUSCH), or physical sidelink shared channel (PSSCH) transmission types, and may include different quantities of data, control, and DMRS symbols/REs.

The EH-capable device 215 may transmit, to the network entity 105-a in response to the control information 240, control information 245 indicative of respective energy costs for the EH-capable device for at least a portion of the one or more slot formats. In some aspects, the energy cost for the at least the portion of the one or more slot types may be based on the different quantities of data, control, and DMRS symbols/REs in the different slot formats. The power costs may be indicated as a part of supported formats for the EH-capable device, and may be common per EH class (e.g., each EH class may have a set of supported slot formats, and the EH-capable device may indicate the cost of each supported slot format). The network entity 105-a may use the energy cost information when scheduling communications 235 for the EH-capable device 215. For example, the network entity 105-a may transmit scheduling information 250 that schedules the communication(s) 235 using one of the slot formats. For example, the scheduling information 250 may be DCI that indicates a selected slot format for the communication 235. The communication 235 may be an PDSCH, a PUSCH, or a PSSCH.

In some aspects, the network entity 105-a may configure a pattern, type of shared channel transmission, or slot format per RRC configuration, where the RRC configuration defines a reference allocation block size (e.g., 1 RE or 1 RB or a set of time/frequency allocations). The network entity 105-a may assign a quantity of DCI resources (e.g., symbols or RBs), data resources, or DMRS resources per RRC configuration (e.g., per pattern, type of shared channel transmission, or slot format, which may be per RRC configuration).

Sidelink communication may involve sidelink mode 1 resource allocation and sidelink mode 2 resource allocation. In sidelink mode 1 resource allocation, the network entity 105-a may allocate dynamic grants (DGs) or configured grants (type 1 or type 2) for the transmitting UE 115. In sidelink mode 2 resource allocation, the transmitting UE 115 may autonomously find and select resources.

In some aspects, where the EH-capable device 215 is the transmitting UE for a sidelink communication in sidelink mode 1 resource allocation, the scheduling information 250 may indicate which slot format to use for the communication 235, where the communication 235 is a PSSCH.

In some aspects, if the EH-capable device 215 is the receiving UE and the UE 115-a is a transmitting UE, the EH-capable device 215 may transmit control information 260 to the UE 115-a indicating the EH-capable device 215 is an EH-capable device and/or the energy costs associated with different sidelink slot formats. In a scheduling request 270, the UE 115-a may indicate the ID or EH class of the EH-capable device 215 to the network entity 105-a, and the network entity 105-a may indicate a slot type to use in the scheduling information 250 that schedules the communication 235 from the UE 115-a to the EH-capable device 215. In sidelink mode 2 resource allocation, the UE 115-a may select the slot format for a communication 235. For example, in an RRC connection between the UE 115-a and the EH-capable device 215, the EH-capable device 215 may indicate the EH class and/or the energy costs associated with different slot formats, and the UE 115-a may select the slot format for a communication 235 based on the indicated EH class and/or the energy costs associated with different slot formats. In some aspects, the EH-capable device 215 may further indicate or update the charging rate, discharging rate, or energy status information of the EH-capable device 215 to the UE 115-a. In sidelink mode 1 resource allocation and in sidelink mode 2 resource allocation, the transmitting UE (e.g., the UE 115-a) may select the slot format based on supported slot types (or supported PSSCH types) which may be agreed upon or indicated in RRC connection between the transmitting UE (e.g., the UE 115-a) and the receiving UE (e.g., the EH-capable device 215).

In some aspects, the UE 115-a may also be an EH-capable device, and the EH-capable device 215 may be the transmitting UE and the UE 115-a may be the receiving UE. The UE 115-a may transmit control information 255 to the EH-capable device 215 indicating the UE 115-a is an EH-capable device and/or the EH class of the UE 115-a and/or the energy costs associated with different sidelink slot formats. In a scheduling request 265, the EH-capable device 215 may indicate the ID or EH class of the UE 115-a to the network entity 105-a, and the network entity 105-a may indicate a slot type to use in the scheduling information 250 that schedules the communication 235 from the EH-capable device 215 to the UE 115-a. In sidelink mode 2 resource allocation, the EH-capable device 215 may select the slot format for a communication 235. For example, in an RRC connection between the UE 115-a and the EH-capable device 215, the UE 115-a may indicate the EH class and/or the energy costs associated with different slot formats, and the EH-capable device 215 may select the slot format for a communication 235 based on the indicated EH class and/or the energy costs associated with different slot formats. In some aspects, the UE 115-a may further indicate or update the charging rate, discharging rate, or energy status information of the UE 115-a to the EH-capable device 215. In sidelink mode 1 resource allocation and in sidelink mode 2 resource allocation, the transmitting UE (e.g., the EH-capable device 215) may select the slot format based on supported slot types (or supported PSSCH types) which may be agreed upon or indicated in RRC connection between the transmitting UE (e.g., the EH-capable device 215) and the receiving UE (e.g., the UE 115-a).

In some aspects, the network entity 105-a may configure each resource pool with a set of multiple slot types for each class of EH UE, then the UEs may select one of them based on the transmitting and receiving UEs. The slot type per resource pool may be categorized as receive slots and transmit slots. A programmable logic controller (PLC), the primary UE, the transmitting UE, or the network entity 105-a may monitor the energy at the receiving UE (e.g., the EH-capable device 215) through power consumption at the receiving UE (e.g., based on the slot types that the receiving UE has communicated and the energy cost per those slot types).

In some aspects, as part of capability signaling or during initial access (e.g., in an SSB, a system information block (SIB) 1, msg1 of a random access channel (RACH) procedure, msg2 of a RACH procedure, msg3 of a RACH procedure, msg4 of a RACH procedure, or other SIB (OSIB)), a reference unit (RE/RB) for slot format information may be sent by the network entity 105-a to the EH-capable device 215. In some aspects, the slot format information may be configured after RRC configuration using layer 1, layer 2, or layer signaling. The slot format information may include the reference unit (e.g., RE or RB) indicated via SSB/SIB1/msg1/msg4/OSIB or a capability inquiry. The EH-capable device 215 may indicate energy costs associated with the slot formats in msg1 or msg3 or as part of the capability information in RRC or in assistance information provided after RRC configuration.

In some aspects, the network entity 105-a or sidelink UEs (e.g., based on resource pool configurations or options) may configure the EH-capable device 215 with patterns or types of potential slot formats with potential values for X, Y, and Z, and then both sides (e.g., both the transmitting and receiving UEs for sidelink or the EH-capable device 215 and the network entity 105-a for uplink or downlink) may determine the energy costs for the different potential slot formats.

In some aspects, the energy costs may be per RB or per RE, then a time and frequency cost may be added. The time and frequency cost may be a linear or non-linear function of the quantity of RBs/REs per OFDM symbol then the quantity of OFDM symbols, or a joint non-linear function in both directions.

In some aspects, the EH-capable device 215 may select the slot format for uplink or downlink based on a latest reported parameter or set of parameters (or a parameter that represents the parameters), where the parameter or set of parameters includes the energy status of the EH-capable device 215, the charging rate of the EH-capable device 215, the discharging rate of the EH-capable device 215, and the battery leakage of the EH-capable device 215 if not part of the discharging rate of the EH-capable device 215.

In some aspects, as a conservative behavior, due to leakage and discharging of a supercapacitor/battery, the EH-capable device 215 may send a scheduling request 265 for a communication 235, where the communication 235 is uplink or sidelink, when the EH-capable device 215 has L % of the required energy to send a grant of an agreed quantity of resources and transmit power between the EH-capable device 215 and the network entity 105-*a* (for uplink) or between the EH-capable device 215 and the UE 115-*a* (for sidelink).

In some aspects, for downlink, the network entity 105-*a* may allocate resources when the EH-capable device 215 has D % of the needed energy to decode/receive the downlink grant. The EH-capable device 215 may indicate to the network entity 105-*a* when the condition (D %) is satisfied. The indication may be in dedicated PUCCH resources or multiplexed with a HARQ acknowledgement (ACK). In some aspects, for sidelink, the network entity 105-*a* or the transmitting UE (e.g., the UE 115-*a*) may allocate resources when the EH-capable device 215 has C % of the needed energy to decode/receive the sidelink transmission. The EH-capable device 215 may indicate to the network entity 105-*a* or the UE 115-*a* when the condition (C %) is satisfied (e.g., via PUCCH resources or multiplexed with HARQ-ACK). The indication when D % or C % is satisfied may be an additional condition to transmit a wake up acknowledgment from the EH-capable device 215.

In some aspects, a scheduling request 265 (when L % is satisfied) or an indication that the downlink (D %) or sidelink (C %) energy condition of the EH-capable device 215 is satisfied may be multiplexed with another channel to save energy (e.g., multiplexed with HARQ-ACK uplink control information (UCI) or with PUSCH/PUCCH or as a MAC control element (MAC-CE) with PUSCH). In some aspects, a ready to receive/decode indication may be added to a buffer status report transmitted by the EH-capable device 215. In some aspects, the EH-capable device 215 may determine an additional cost of the C % or D % after computing the scheduling request or the cost to transmit the indication that the EH-capable device 215 is ready to receive/decode. In some aspects, when the EH-capable device 215 is equipped with RFID tag radio, the EH-capable device 215 may use backscattering modulation to indicate the scheduling request 265 or the ready to receive/decode.

Figure 3:
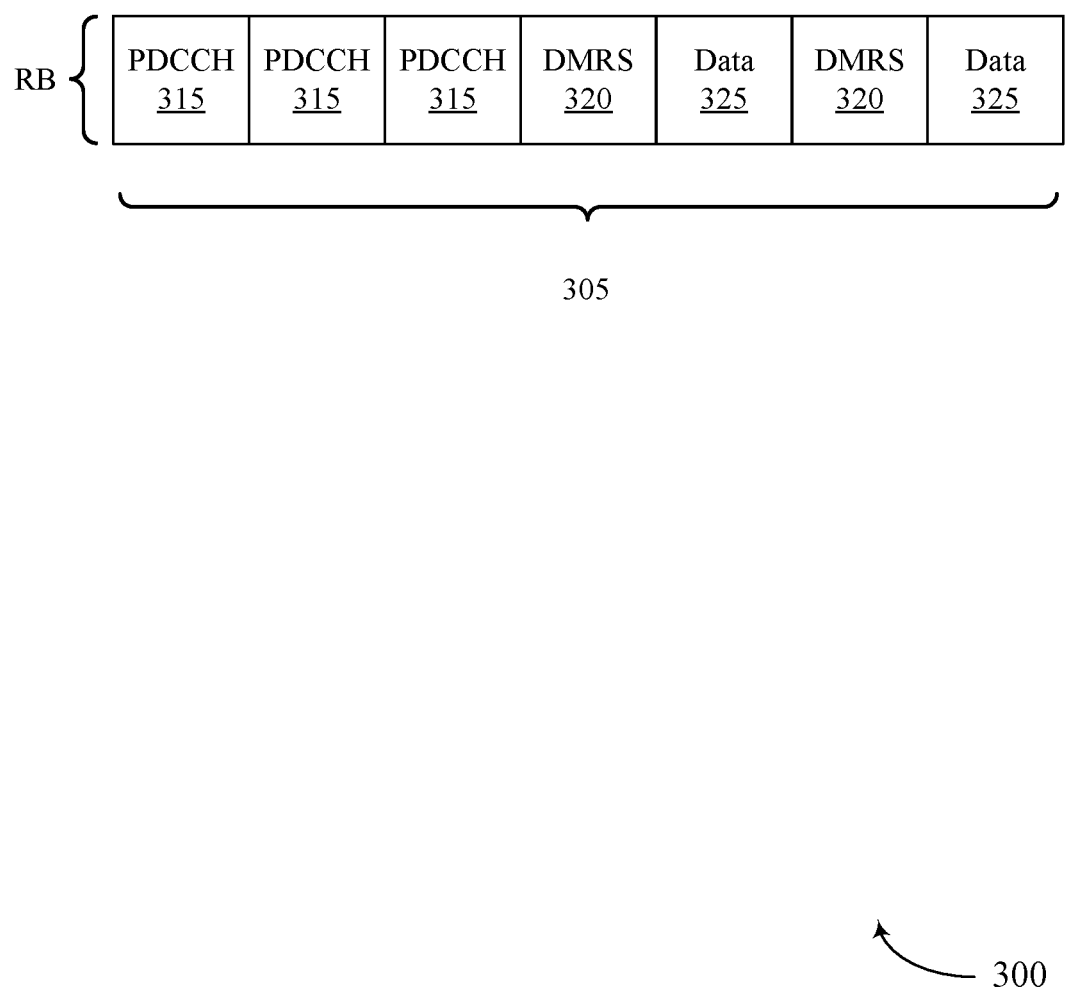
FIG. 3 shows an example of a slot diagram that supports different slot formats and transmission types for EH-capable devices in accordance with one or more aspects of the present disclosure.

FIG. 3 shows an example of a slot diagram 300 that supports different slot formats and transmission types for EH-capable devices in accordance with one or more aspects of the present disclosure. The slot diagram 300 may implement or may be implemented by aspects of the wireless communications system 100 or the wireless communications system 200.

As described herein, multiple slot formats may be supported and defined for downlink or uplink shared channel transmissions between an EH-capable device 215 and a network entity 105. A downlink or uplink slot 305 may include control symbols 315 (e.g., PDCCH symbols), DMRS symbols 320, and data symbols 325 (e.g., PDSCH symbols for a downlink slot or PUSCH symbols for an uplink slot). As described herein, processing control symbols 315, processing DMRS symbols 320, and processing data symbols 325 may involve different energy costs at the EH-capable device 215. Accordingly, different slot formats may have different quantities of control symbols 315, DMRS symbols 320, and data symbols 325, and/or different lengths of the symbols.

Figure 4:
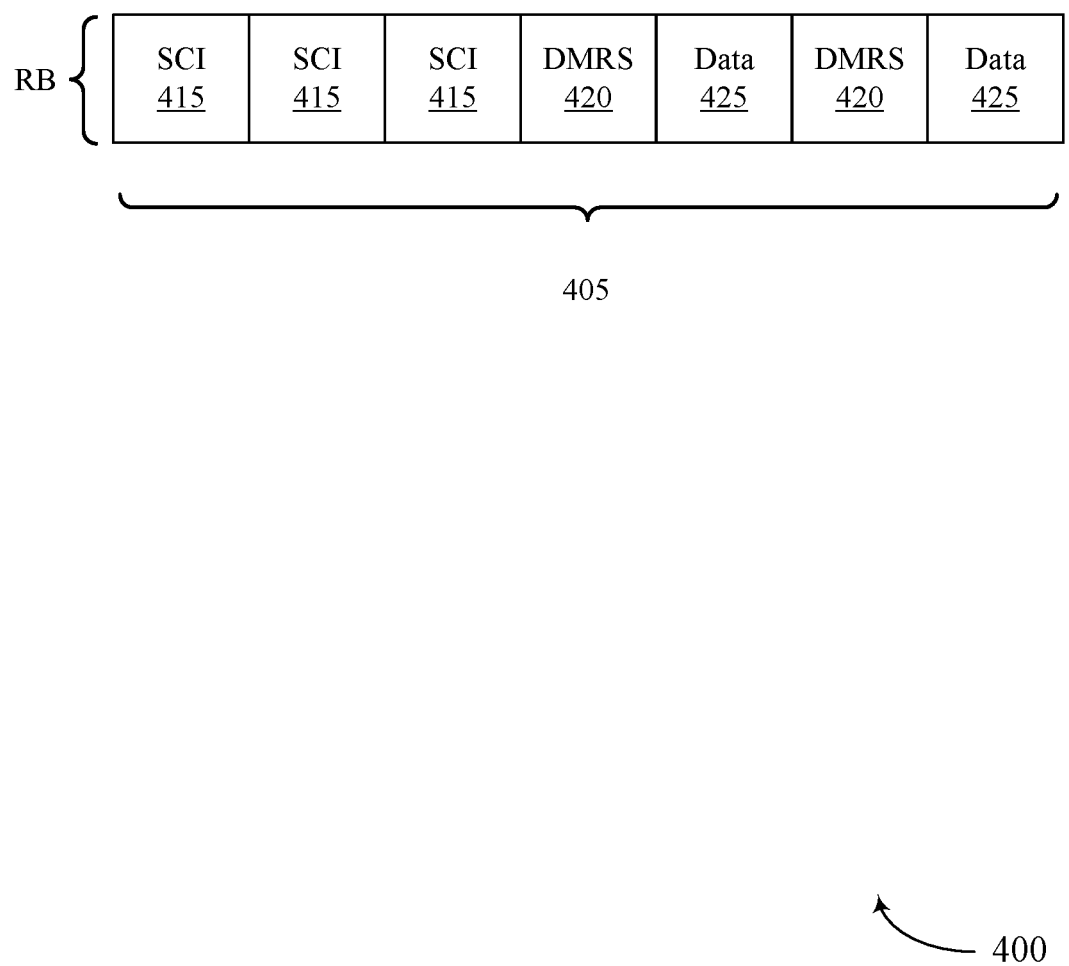
FIG. 4 shows an example of a slot diagram that supports different slot formats and transmission types for EH-capable devices in accordance with one or more aspects of the present disclosure.

FIG. 4 shows an example of a slot diagram 400 that supports different slot formats and transmission types for EH-capable devices in accordance with one or more aspects of the present disclosure. The slot diagram 400 may implement or may be implemented by aspects of the wireless communications system 100 or the wireless communications system 200.

As described herein, multiple slot formats may be supported and defined for downlink or uplink shared channel transmissions between an EH-capable device 215 and a network entity 105. A sidelink slot 405 may include control symbols 415 (e.g., physical sidelink control channel (PSCCH) symbols that convey sidelink control information (SCI)), DMRS symbols 420, and data symbols (e.g., physical sidelink shared channel (PSSCH)). As described herein, processing control symbols 415, processing DMRS symbols 420, and processing data symbols may involve different energy costs at the EH-capable device 215. Accordingly, different slot formats may have different quantities of control symbols 415, DMRS symbols 420, and data symbols 425, and/or different lengths of the symbols.

Figure 5:
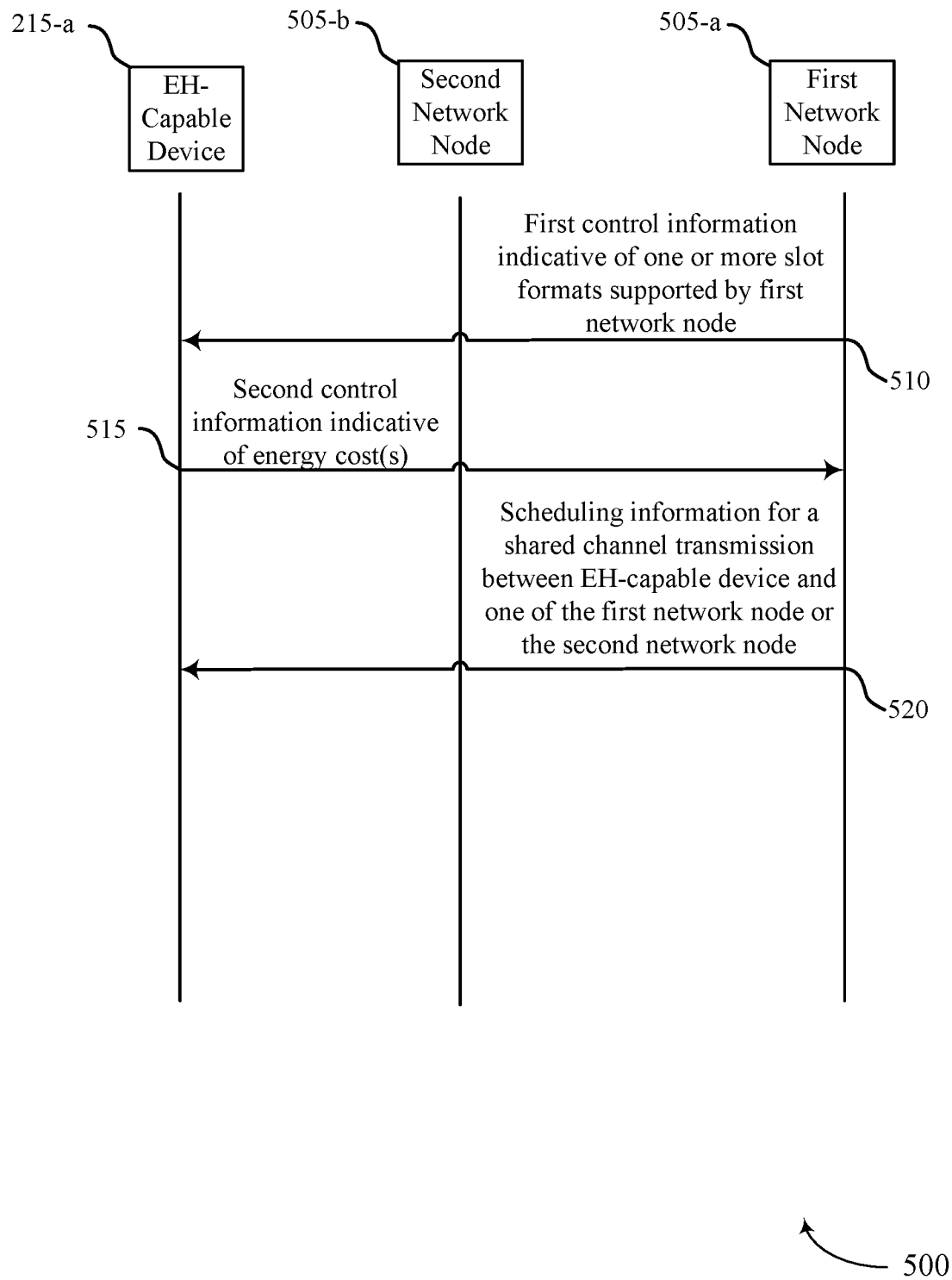
FIG. 5 shows an example of a process flow that supports different slot formats and transmission types for EH-capable devices in accordance with one or more aspects of the present disclosure.

FIG. 5 shows an example of a process flow 500 that supports different slot formats and transmission types for EH-capable devices in accordance with one or more aspects of the present disclosure. The process flow 500 may include an EH-capable device 215-*a*, which may be an example of an EH-capable device 215 as described herein. The process flow 500 may include a first network node 505-*a*. In some aspects, the first network node 505-*a* may be an example of a network entity 105 as described herein. The process flow 500 may include a second network node 505-*b*. In some aspects, the second network node 505-*b* may be an example of a UE 115 or an EH-capable device 215 as described herein.

In the following description of the process flow 500, the operations between the EH-capable device 215-*a*, the first network node 505-*a*, and the second network node 505-*b* may be transmitted in a different order than the example order shown, or the operations performed by the EH-capable device 215-*a*, the first network node 505-*a*, and the second network node 505-*b* may be performed in different orders or at different times. Some operations may also be omitted from the process flow 500, and other operations may be added to the process flow 500.

At 510, the EH-capable device 215-*a* may receive, from the first network node 505-*a*, first control information indicative of one or more slot formats which are supported by the first network node 505-*a* for EH-associated communications. In some aspects, the one or more slot formats include a pattern of signal types within a slot or a plurality of slots. In some aspects, the signal types include one or more control channel types, one or more reference signal types, one or more data channel types, one or more uplink message types, one or more downlink message types, one or more sidelink message types, or combinations thereof. In some aspects, the first control information includes one or more sets of RRC parameters, where each set of RRC parameters of the one or more sets of RRC parameters corresponds to one respective slot format of the one or more slot formats, and where each set of RRC parameters of the one or more sets of RRC parameters defines a respective reference allocation block size and a respective resource set for the respective slot format to which the respective set of RRC parameters corresponds.

At 515, the EH-capable device 215-*a* may transmit, based on the first control information, second control information to the first network node 505-*a*, where the second control information is indicative of a respective energy cost for the EH-capable device 215-*a* for each respective portion of one or more portions of the one or more slot formats.

At 520, the EH-capable device 215-*a* may receive, from the first network node 505-*a*, scheduling information that schedules a shared channel transmission between the EH-capable device 215-*a* and one of the first network node 505-*a* or a second network node 505-*b*, where the scheduling information is based on the second control information.

In some aspects, the shared channel transmission is a downlink transmission or an uplink transmission between the first network node 505-*a* and the EH-capable device 215-*a*.

In some aspects, the shared channel transmission is a sidelink transmission between the second network node 505-*b* and the EH-capable device 215-*a*. In some aspects, the scheduling information includes an indication of a transmission type for the sidelink transmission.

In some aspects, the EH-capable device 215-*a* may transmit, to the first network node 505-*a*, third control information indicative of an identifier or a class identifier of the second network node 505-*b*, where the second network node 505-*b* is a second EH-capable device. The EH-capable device 215-*a* may receive, from the first network node 505-*a*, fourth control information indicative of one or more second slot formats for the second network node 505-*b* for communications with the EH-capable device 215-*a*.

In some aspects, the EH-capable device 215-*a* may communicate a second shared channel transmission with the second network node 505-*b* using a particular slot format of one or more second slot formats, where the one or more second slot formats are for the second network node 505-*b* for EH associated communications, where the second network node 505-*b* is a second EH-capable device, and where the particular slot format is based on a second shared channel transmission type that corresponds to an expected communication between the EH-capable device 215-*a* and the second network node 505-*b*. In some aspects, the EH-capable device 215-*a* may receive, from the second network node 505-*b*, third control information indicative of a respective energy cost for each respective portion of one or more portions of the one or more second slot formats. In some aspects, the EH-capable device 215-*a* may transmit, to the first network node 505-*a*, fourth control information indicative of the respective energy cost for each respective portion of the one or more portions of the one or more second slot formats, and the EH-capable device 215-*a* may receive, from the first network node 505-*a*, second scheduling information that schedules the second shared channel transmission between the EH-capable device 215-*a* and the second network node 505-*b*, where the second scheduling information is based on the fourth control information. In some aspects, the EH-capable device 215-*a* may communicate the second shared channel transmission using one of the one or more second slot formats based on the third control information indicative of the respective energy cost for each respective portion of the one or more portions of the one or more second slot formats.

In some aspects, the EH-capable device 215-*a* may communicate, with the first network node 505-*a*, the shared channel transmission using one of the one or more slot formats based on an energy status of the EH-capable device 215-*a*, a charging rate of the EH-capable device 215-*a*, a discharge rate of the EH-capable device 215-*a*, a battery leakage of the EH-capable device 215-*a* or a combination thereof.

In some aspects, the EH-capable device 215-*a* may transmit, to the first network node 505-*a*, a scheduling request for a second shared channel transmission between the EH-capable device 215-*a* and one of the first network node 505-*a* or the second network node 505-*b*, and the scheduling request is based on an energy level at the EH-capable device 215-*a* being sufficient for communication of the second shared channel transmission.

In some aspects, the EH-capable device 215-*a* may transmit, to the first network node 505-*a*, third control information indicative of an energy level at the EH-capable device 215-*a* being sufficient for the shared channel transmission, and the scheduling information is responsive to the third control information.

Figure 6:
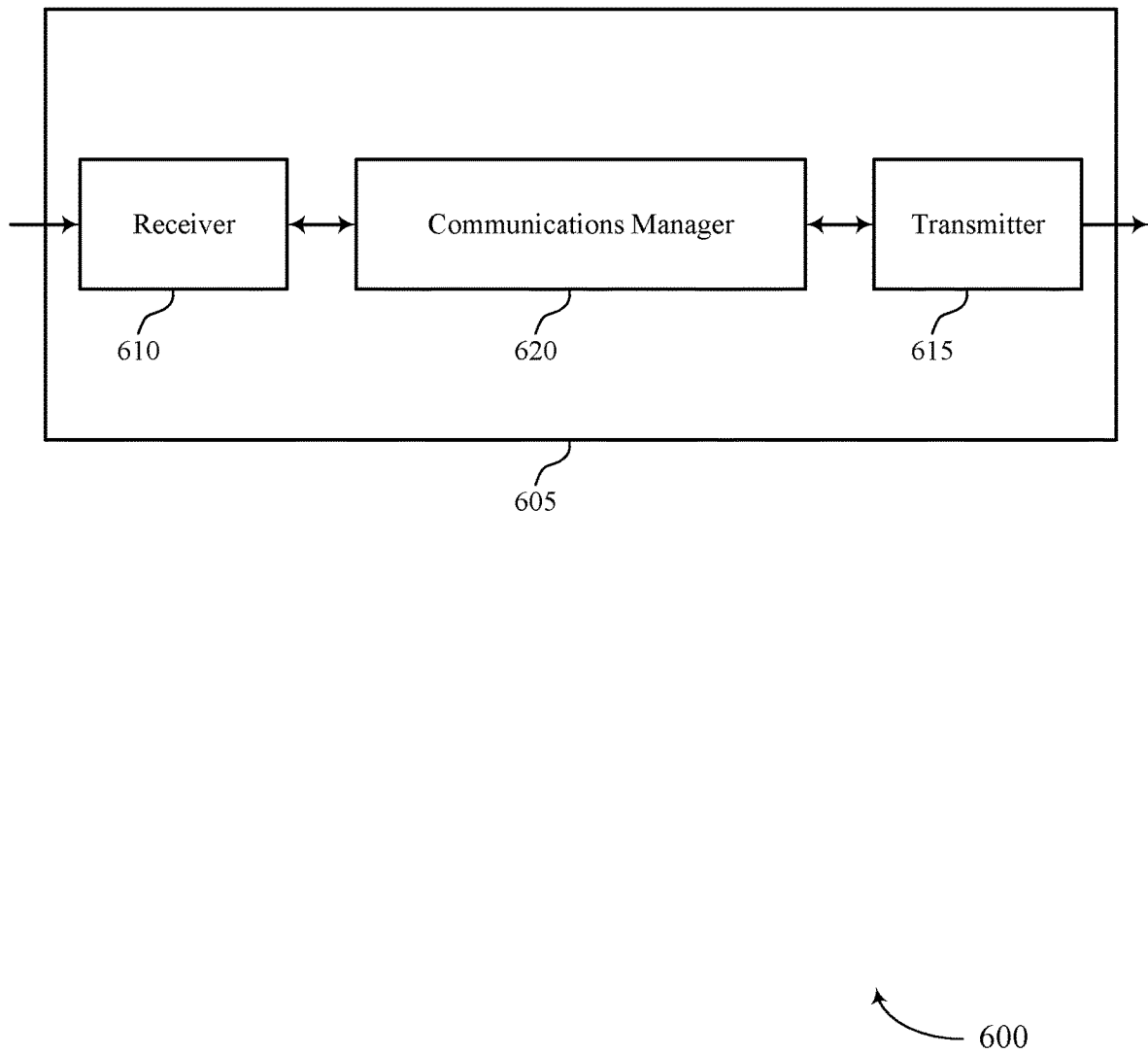
FIGS. 6 and 7 show block diagrams of devices that support different slot formats and transmission types for EH-capable devices in accordance with one or more aspects of the present disclosure.

FIG. 6 shows a block diagram 600 of a device 605 that supports different slot formats and transmission types for EH-capable devices in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to slot formats and transmission types for EH-capable devices). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to slot formats and transmission types for EH-capable devices). In some aspects, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of slot formats and transmission types for EH-capable devices as described herein. For example, the communications manager 620, the receiver 610, the transmitter 615, or various combinations or components thereof may support a method for performing one or more of the functions described herein.

In some aspects, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at an EH-capable device in accordance with examples as disclosed herein. For example, the communications manager 620 is capable of, configured to, or operable to support a means for receiving, from a first network node, first control information indicative of one or more slot formats which are supported by the first network node for EH-associated communications. The communications manager 620 is capable of, configured to, or operable to support a means for transmitting, based on the first control information, second control information to the first network node, where the second control information is indicative of a respective energy cost for the EH-capable device for each respective portion of one or more portions of the one or more slot formats. The communications manager 620 is capable of, configured to, or operable to support a means for receiving, from the first network node, scheduling information that schedules a shared channel transmission between the EH-capable device and one of the first network node or a second network node, where the scheduling information is based on the second control information.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced power consumption and more efficient utilization of communication resources.

Figure 7:
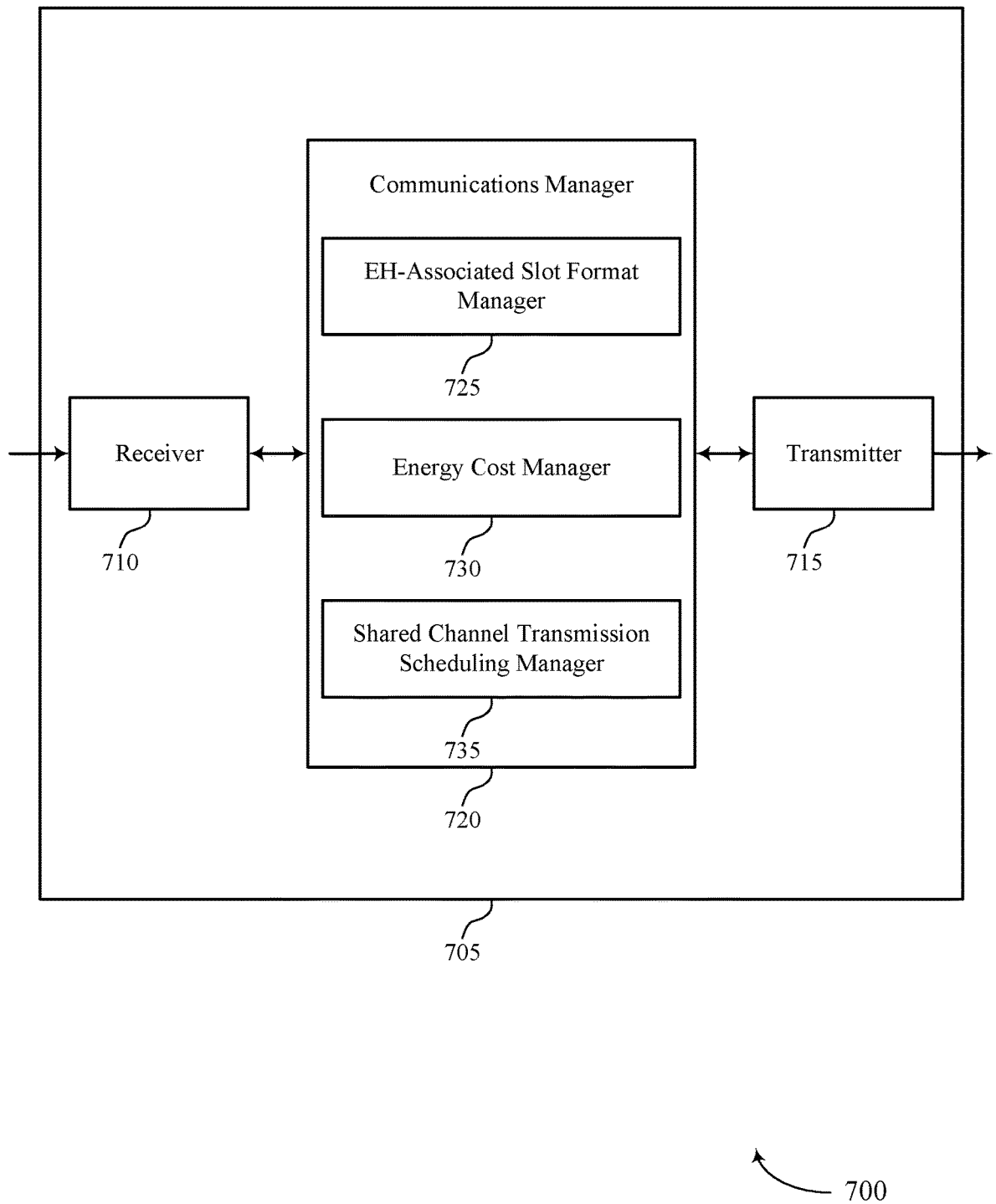

FIG. 7 shows a block diagram 700 of a device 705 that supports different slot formats and transmission types for EH-capable devices in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to slot formats and transmission types for EH-capable devices). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to slot formats and transmission types for EH-capable devices). In some aspects, the transmitter 715 may be co-located with a receiver 710 in a transceiver module. The transmitter 715 may utilize a single antenna or a set of multiple antennas.

The device 705, or various components thereof, may be an example of means for performing various aspects of slot formats and transmission types for EH-capable devices as described herein. For example, the communications manager 720 may include a EH-associated slot format manager 725, an energy cost manager 730, a shared channel transmission scheduling manager 735, or any combination thereof. The communications manager 720 may be an example of aspects of a communications manager 620 as described herein. In some aspects, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at an EH-capable device in accordance with examples as disclosed herein. The EH-associated slot format manager 725 is capable of, configured to, or operable to support a means for receiving, from a first network node, first control information indicative of one or more slot formats which are supported by the first network node for EH-associated communications. The energy cost manager 730 is capable of, configured to, or operable to support a means for transmitting, based on the first control information, second control information to the first network node, where the second control information is indicative of a respective energy cost for the EH-capable device for each respective portion of one or more portions of the one or more slot formats. The shared channel transmission scheduling manager 735 is capable of, configured to, or operable to support a means for receiving, from the first network node, scheduling information that schedules a shared channel transmission between the EH-capable device and one of the first network node or a second network node, where the scheduling information is based on the second control information.

Figure 8:
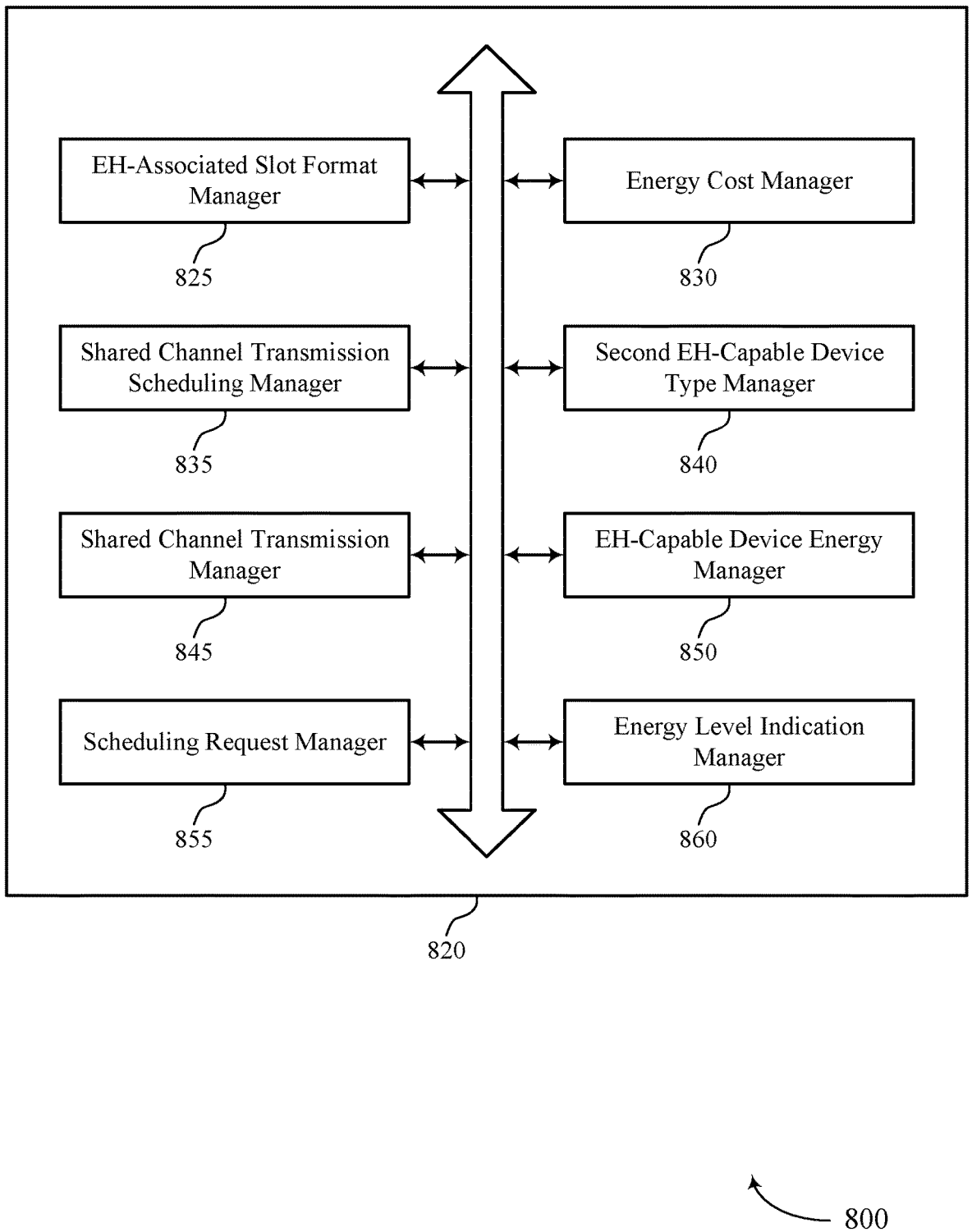
FIG. 8 shows a block diagram of a communications manager that supports different slot formats and transmission types for EH-capable devices in accordance with one or more aspects of the present disclosure.

FIG. 8 shows a block diagram 800 of a communications manager 820 that supports different slot formats and transmission types for EH-capable devices in accordance with one or more aspects of the present disclosure. The communications manager 820 may be an example of aspects of a communications manager 620, a communications manager 720, or both, as described herein. The communications manager 820, or various components thereof, may be an example of means for performing various aspects of slot formats and transmission types for EH-capable devices as described herein. For example, the communications manager 820 may include a EH-associated slot format manager 825, an energy cost manager 830, a shared channel transmission scheduling manager 835, a second EH-capable device type manager 840, a shared channel transmission manager 845, a EH-capable device energy manager 850, a scheduling request manager 855, an energy level indication manager 860, or any combination thereof. Each of these components may communicate, directly or indirectly, with one another (e.g., via one or more buses).

The communications manager 820 may support wireless communications at an EH-capable device in accordance with examples as disclosed herein. The EH-associated slot format manager 825 is capable of, configured to, or operable to support a means for receiving, from a first network node, first control information indicative of one or more slot formats which are supported by the first network node for EH-associated communications. The energy cost manager 830 is capable of, configured to, or operable to support a means for transmitting, based on the first control information, second control information to the first network node, where the second control information is indicative of a respective energy cost for the EH-capable device for each respective portion of one or more portions of the one or more slot formats. The shared channel transmission scheduling manager 835 is capable of, configured to, or operable to support a means for receiving, from the first network node, scheduling information that schedules a shared channel transmission between the EH-capable device and one of the first network node or a second network node, where the scheduling information is based on the second control information.

In some aspects, the one or more slot formats include a pattern of signal types within a slot or a set of multiple slots.

In some aspects, the signal types include one or more control channel types, one or more reference signal types, one or more data channel types, one or more uplink message types, one or more downlink message types, one or more sidelink message types, or combinations thereof.

In some aspects, the first control information includes one or more sets of RRC parameters. In some aspects, each set of RRC parameters of the one or more sets of RRC parameters corresponds to one respective slot format of the one or more slot formats. In some aspects, each set of RRC parameters of the one or more sets of RRC parameters defines a respective reference allocation block size and a respective resource set for the respective slot format to which the respective set of RRC parameters corresponds.

In some aspects, the shared channel transmission is a downlink transmission or an uplink transmission between the first network node and the EH-capable device.

In some aspects, the shared channel transmission is a sidelink transmission between the second network node and the EH-capable device.

In some aspects, the scheduling information includes an indication of a transmission type for the sidelink transmission.

In some aspects, the second EH-capable device type manager 840 is capable of, configured to, or operable to support a means for transmitting, to the first network node, third control information indicative of an identifier or a class identifier of the second network node, where the second network node is a second EH-capable device. In some aspects, the EH-associated slot format manager 825 is capable of, configured to, or operable to support a means for receiving, from the first network node, fourth control information indicative of one or more second slot formats for the second network node for communications with the EH-capable device.

In some aspects, the shared channel transmission manager 845 is capable of, configured to, or operable to support a means for communicating a second shared channel transmission with the second network node using a particular slot format of one or more second slot formats, where the one or more second slot formats are for the second network node for EH associated communications, where the second network node is a second EH-capable device, and where the particular slot format is based on a second shared channel transmission type that corresponds to an expected communication between the EH-capable device and the second network node.

In some aspects, the energy cost manager 830 is capable of, configured to, or operable to support a means for receiving, from the second network node, third control information indicative of a respective energy cost for each respective portion of one or more portions of the one or more second slot formats.

In some aspects, the energy cost manager 830 is capable of, configured to, or operable to support a means for transmitting, to the first network node, fourth control information indicative of the respective energy cost for each respective portion of the one or more portions of the one or more second slot formats. In some aspects, the shared channel transmission scheduling manager 835 is capable of, configured to, or operable to support a means for receiving, from the first network node, second scheduling information that schedules the second shared channel transmission between the EH-capable device and the second network node, where the second scheduling information is based on the fourth control information.

In some aspects, to support communicating the second shared channel transmission, the shared channel transmission manager 845 is capable of, configured to, or operable to support a means for communicating the second shared channel transmission using one of the one or more second slot formats based on the third control information indicative of the respective energy cost for each respective portion of the one or more portions of the one or more second slot formats.

In some aspects, the EH-capable device energy manager 850 is capable of, configured to, or operable to support a means for communicating, with the first network node, the shared channel transmission using one of the one or more slot formats based on an energy status of the EH-capable device, a charging rate of the EH-capable device, a discharge rate of the EH-capable device, a battery leakage of the EH-capable device or a combination thereof.

In some aspects, the scheduling request manager 855 is capable of, configured to, or operable to support a means for transmitting, to the first network node, a scheduling request for a second shared channel transmission between the EH-capable device and one of the first network node or the second network node, where the scheduling request is based on an energy level at the EH-capable device being sufficient for communication of the second shared channel transmission.

In some aspects, the energy level indication manager 860 is capable of, configured to, or operable to support a means for transmitting, to the first network node, third control information indicative of an energy level at the EH-capable device being sufficient for the shared channel transmission, where the scheduling information is responsive to the third control information.

Figure 9:
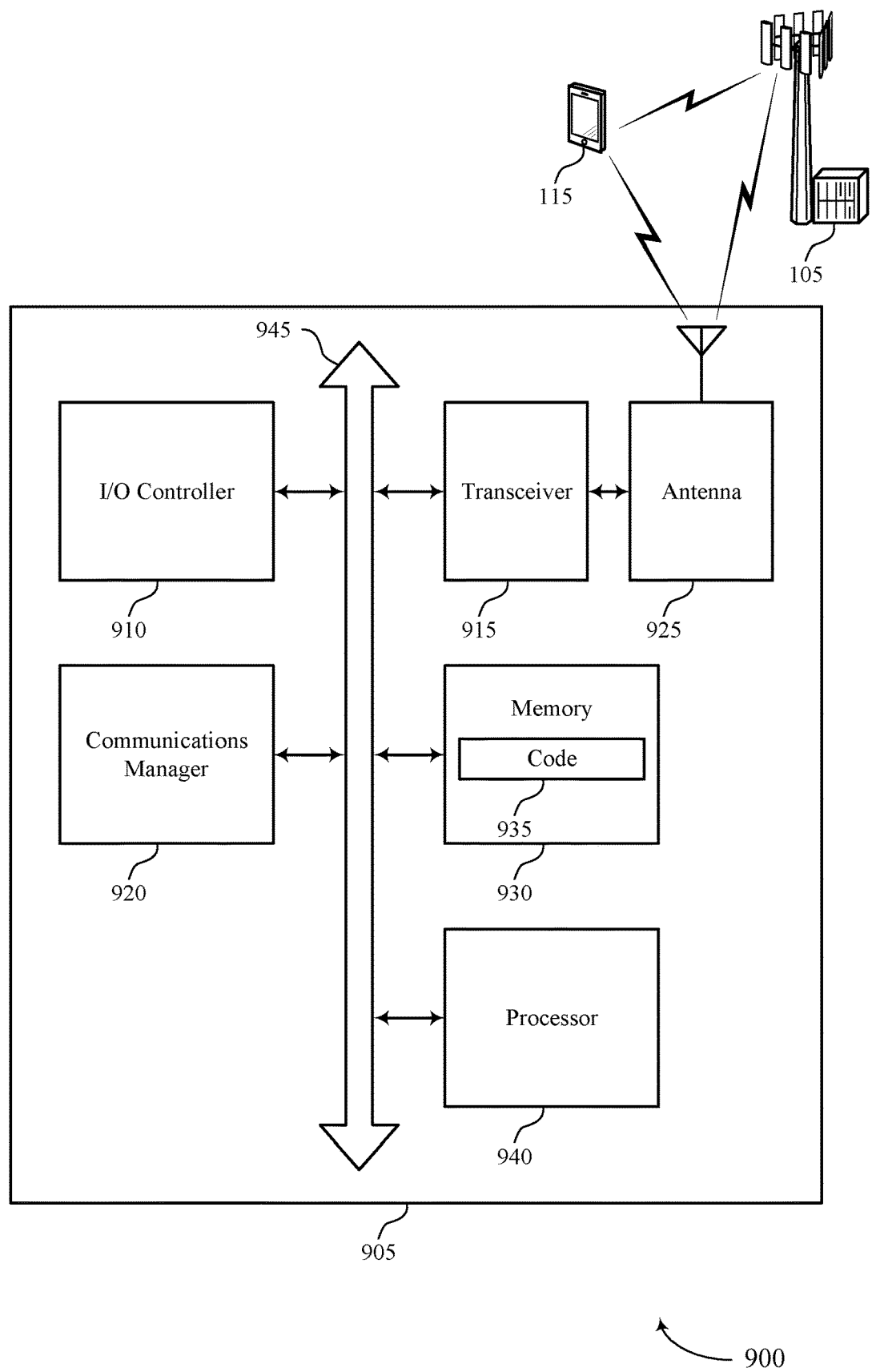
FIG. 9 shows a diagram of a system including a device that supports different slot formats and transmission types for EH-capable devices in accordance with one or more aspects of the present disclosure.

FIG. 9 shows a diagram of a system 900 including a device 905 that supports different slot formats and transmission types for EH-capable devices in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting different slot formats and transmission types for EH-capable devices). For example, the device 905 or a component of the device 905 may include a processor 940 and memory 930 coupled with or to the processor 940, the processor 940 and memory 930 configured to perform various functions described herein.

The communications manager 920 may support wireless communications at an EH-capable device in accordance with examples as disclosed herein. For example, the communications manager 920 is capable of, configured to, or operable to support a means for receiving, from a first network node, first control information indicative of one or more slot formats which are supported by the first network node for EH-associated communications. The communications manager 920 is capable of, configured to, or operable to support a means for transmitting, based on the first control information, second control information to the first network node, where the second control information is indicative of a respective energy cost for the EH-capable device for each respective portion of one or more portions of the one or more slot formats. The communications manager 920 is capable of, configured to, or operable to support a means for receiving, from the first network node, scheduling information that schedules a shared channel transmission between the EH-capable device and one of the first network node or a second network node, where the scheduling information is based on the second control information.

By including or configuring the communications manager 920 in accordance with examples as described herein, the device 905 may support techniques for reduced power consumption, more efficient utilization of communication resources, improved coordination between devices, and longer battery life.

In some aspects, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some aspects, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of slot formats and transmission types for EH-capable devices as described herein, or the processor 940 and the memory 930 may be otherwise configured to perform or support such operations.

Figure 10:
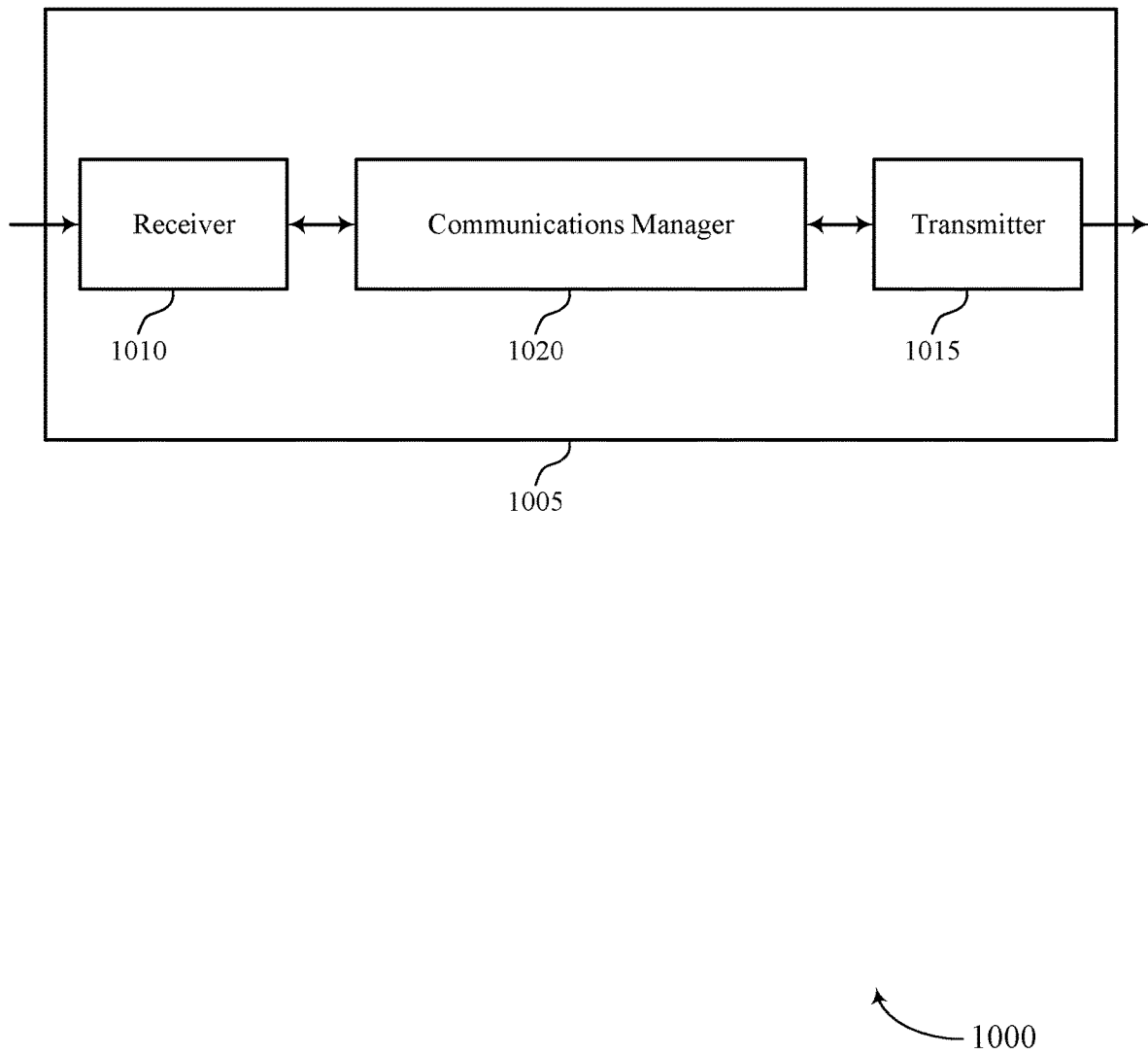
FIGS. 10 and 11 show block diagrams of devices that support different slot formats and transmission types for EH-capable devices in accordance with one or more aspects of the present disclosure.

FIG. 10 shows a block diagram 1000 of a device 1005 that supports different slot formats and transmission types for EH-capable devices in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some aspects, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some aspects, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of slot formats and transmission types for EH-capable devices as described herein. For example, the communications manager 1020, the receiver 1010, the transmitter 1015, or various combinations or components thereof may support a method for performing one or more of the functions described herein.

In some aspects, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a first network node in accordance with examples as disclosed herein. For example, the communications manager 1020 is capable of, configured to, or operable to support a means for transmitting, to an EH-capable device, first control information indicative of one or more slot formats which are supported by the first network node for EH-associated communications. The communications manager 1020 is capable of, configured to, or operable to support a means for receiving, based on the first control information, second control information from the EH-capable device, where the second control information is indicative of a respective energy cost for the EH-capable device for each respective portion of one or more portions of the one or more slot formats. The communications manager 1020 is capable of, configured to, or operable to support a means for transmitting, to the EH-capable device, scheduling information that schedules a shared channel transmission between the EH-capable device and one of the first network node or a second network node, where the scheduling information is based on the second control information.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced power consumption and more efficient utilization of communication resources.

Figure 11:
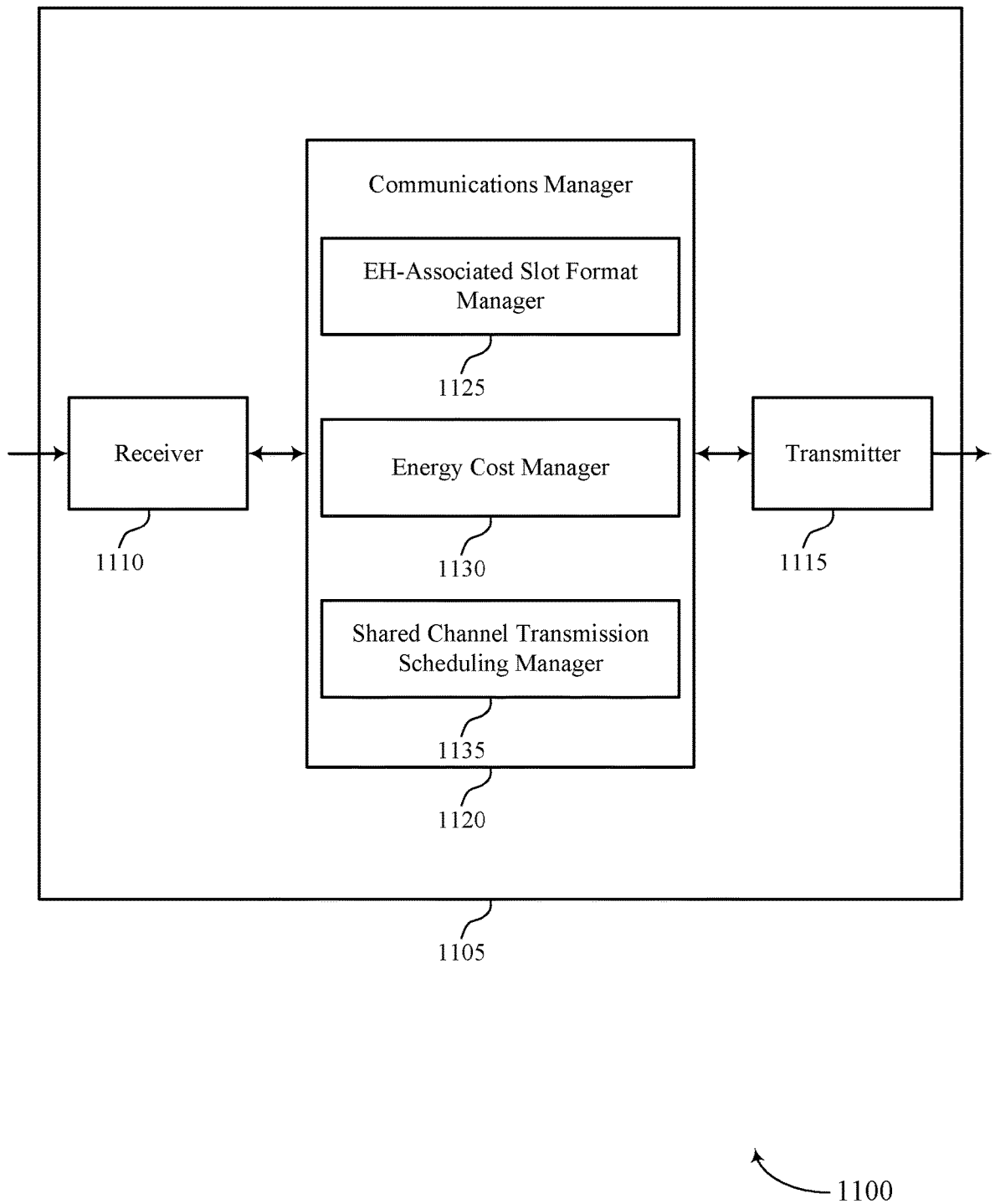

FIG. 11 shows a block diagram 1100 of a device 1105 that supports different slot formats and transmission types for EH-capable devices in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some aspects, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some aspects, the transmitter 1115 and the receiver 1110 may be co-located in a transceiver, which may include or be coupled with a modem.

The device 1105, or various components thereof, may be an example of means for performing various aspects of slot formats and transmission types for EH-capable devices as described herein. For example, the communications manager 1120 may include a EH-associated slot format manager 1125, an energy cost manager 1130, a shared channel transmission scheduling manager 1135, or any combination thereof. The communications manager 1120 may be an example of aspects of a communications manager 1020 as described herein. In some aspects, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a first network node in accordance with examples as disclosed herein. The EH-associated slot format manager 1125 is capable of, configured to, or operable to support a means for transmitting, to an EH-capable device, first control information indicative of one or more slot formats which are supported by the first network node for EH-associated communications. The energy cost manager 1130 is capable of, configured to, or operable to support a means for receiving, based on the first control information, second control information from the EH-capable device, where the second control information is indicative of a respective energy cost for the EH-capable device for each respective portion of one or more portions of the one or more slot formats. The shared channel transmission scheduling manager 1135 is capable of, configured to, or operable to support a means for transmitting, to the EH-capable device, scheduling information that schedules a shared channel transmission between the EH-capable device and one of the first network node or a second network node, where the scheduling information is based on the second control information.

Figure 12:
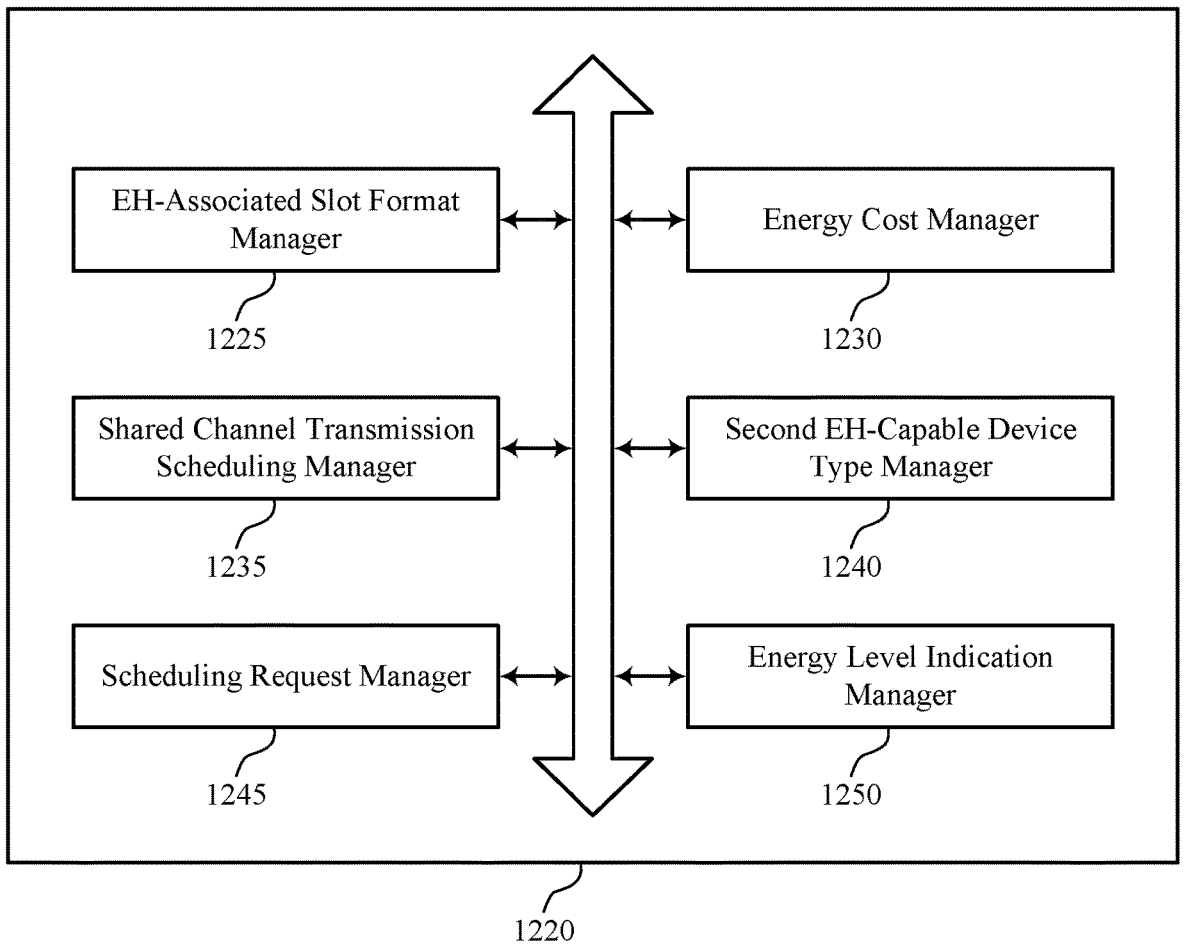
FIG. 12 shows a block diagram of a communications manager that supports different slot formats and transmission types for EH-capable devices in accordance with one or more aspects of the present disclosure.

FIG. 12 shows a block diagram 1200 of a communications manager 1220 that supports different slot formats and transmission types for EH-capable devices in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of slot formats and transmission types for EH-capable devices as described herein. For example, the communications manager 1220 may include a EH-associated slot format manager 1225, an energy cost manager 1230, a shared channel transmission scheduling manager 1235, a second EH-capable device type manager 1240, a scheduling request manager 1245, an energy level indication manager 1250, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a first network node in accordance with examples as disclosed herein. The EH-associated slot format manager 1225 is capable of, configured to, or operable to support a means for transmitting, to an EH-capable device, first control information indicative of one or more slot formats which are supported by the first network node for EH-associated communications. The energy cost manager 1230 is capable of, configured to, or operable to support a means for receiving, based on the first control information, second control information from the EH-capable device, where the second control information is indicative of a respective energy cost for the EH-capable device for each respective portion of one or more portions of the one or more slot formats. The shared channel transmission scheduling manager 1235 is capable of, configured to, or operable to support a means for transmitting, to the EH-capable device, scheduling information that schedules a shared channel transmission between the EH-capable device and one of the first network node or a second network node, where the scheduling information is based on the second control information.

In some aspects, the one or more slot formats include a pattern of signal types within a slot or a set of multiple slots.

In some aspects, the signal types include one or more control channel types, one or more reference signal types, one or more data channel types, one or more uplink message types, one or more downlink message types, one or more sidelink message types, or combinations thereof.

In some aspects, the first control information includes one or more sets of RRC parameters. In some aspects, each set of RRC parameters of the one or more sets of RRC parameters corresponds to one respective slot format of the one or more slot formats. In some aspects, each set of RRC parameters of the one or more sets of RRC parameters defines a respective reference block allocation size and a respective resource set for the respective slot format to which the respective set of RRC parameters corresponds.

In some aspects, the shared channel transmission is a downlink transmission or an uplink transmission between the first network node and the EH-capable device.

In some aspects, the shared channel transmission is a sidelink transmission between the second network node and the EH-capable device.

In some aspects, the second EH-capable device type manager 1240 is capable of, configured to, or operable to support a means for receiving, from the EH-capable device, third control information indicative of an identifier or a class identifier of the second network node, where the second network node is a second EH-capable device. In some aspects, the EH-associated slot format manager 1225 is capable of, configured to, or operable to support a means for transmitting, to the EH-capable device, fourth control information indicative of one or more second slot formats for the second network node for communications with the EH-capable device.

In some aspects, the energy cost manager 1230 is capable of, configured to, or operable to support a means for receiving, from the EH-capable device, fifth control information indicative of a respective energy cost for the second network node for each respective portion of one or more portions of the one or more second slot formats.

In some aspects, the scheduling request manager 1245 is capable of, configured to, or operable to support a means for receiving, from the EH-capable device, a scheduling request for a second shared channel transmission between the EH-capable device and one of the first network node or the second network node, where the scheduling request is based on an energy level at the EH-capable device being sufficient for communication of the second shared channel transmission.

In some aspects, the energy level indication manager 1250 is capable of, configured to, or operable to support a means for receive, from the EH-capable device, third control information indicative of an energy level at the EH-capable device being sufficient for the shared channel transmission, where the scheduling information is responsive to the third control information.

Figure 13:
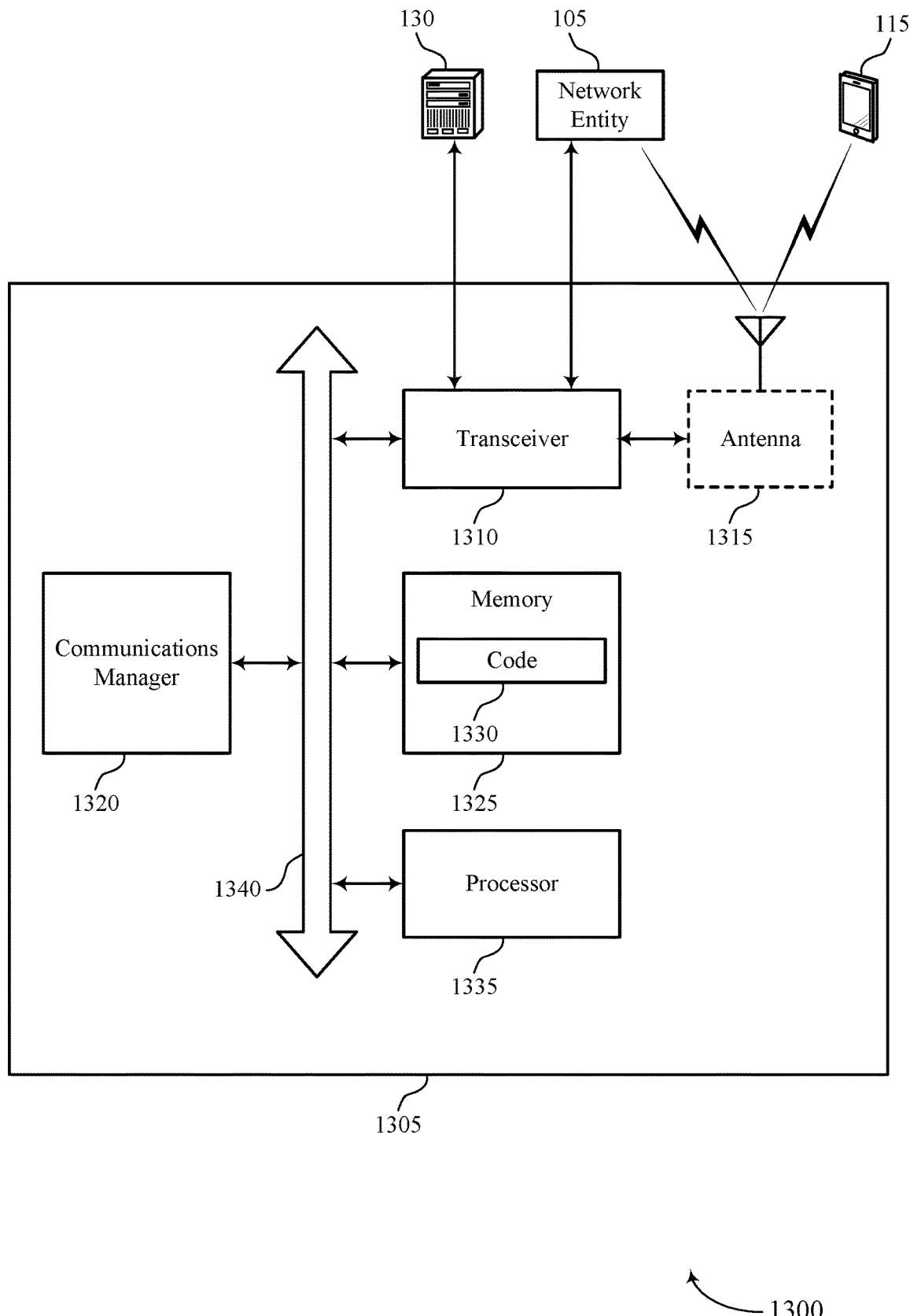
FIG. 13 shows a diagram of a system including a device that supports different slot formats and transmission types for EH-capable devices in accordance with one or more aspects of the present disclosure.

FIG. 13 shows a diagram of a system 1300 including a device 1305 that supports different slot formats and transmission types for EH-capable devices in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some aspects, the transceiver 1310 may include a wired transceiver and may communicate bi-directionally with another wired transceiver. Additionally, or alternatively, in some aspects, the transceiver 1310 may include a wireless transceiver and may communicate bi-directionally with another wireless transceiver. In some aspects, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate or output information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some aspects, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting different slot formats and transmission types for EH-capable devices). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some aspects, a bus 1340 may support communications of (e.g., within) a protocol layer of a protocol stack. In some aspects, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some aspects, the communications manager 1320 may manage aspects of communications with a core network 130 (e.g., via one or more wired or wireless backhaul links). For example, the communications manager 1320 may manage the transfer of data communications for client devices, such as one or more UEs 115. In some aspects, the communications manager 1320 may manage communications with other network entities 105, and may include a controller or scheduler for controlling communications with UEs 115 in cooperation with other network entities 105. In some aspects, the communications manager 1320 may support an X2 interface within an LTE/LTE-A wireless communications network technology to provide communication between network entities 105.

The communications manager 1320 may support wireless communications at a first network node in accordance with examples as disclosed herein. For example, the communications manager 1320 is capable of, configured to, or operable to support a means for transmitting, to an EH-capable device, first control information indicative of one or more slot formats which are supported by the first network node for EH-associated communications. The communications manager 1320 is capable of, configured to, or operable to support a means for receiving, based on the first control information, second control information from the EH-capable device, where the second control information is indicative of a respective energy cost for the EH-capable device for each respective portion of one or more portions of the one or more slot formats. The communications manager 1320 is capable of, configured to, or operable to support a means for transmitting, to the EH-capable device, scheduling information that schedules a shared channel transmission between the EH-capable device and one of the first network node or a second network node, where the scheduling information is based on the second control information.

By including or configuring the communications manager 1320 in accordance with examples as described herein, the device 1305 may support techniques for reduced power consumption, more efficient utilization of communication resources, improved coordination between devices, and longer battery life.

In some aspects, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some aspects, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of slot formats and transmission types for EH-capable devices as described herein, or the processor 1335 and the memory 1325 may be otherwise configured to perform or support such operations.

Figure 14:
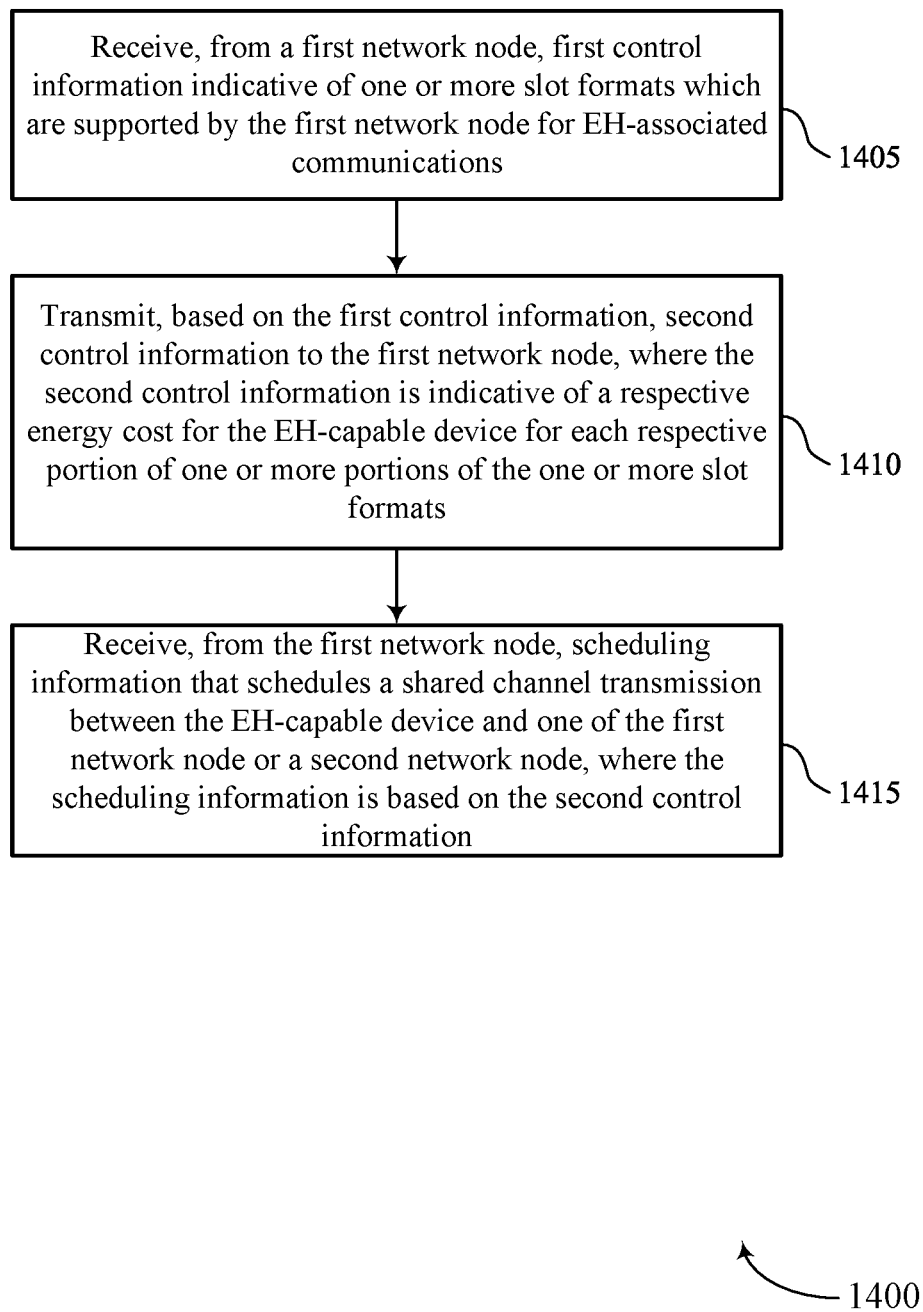
FIGS. 14 and 15 show flowcharts illustrating methods that support different slot formats and transmission types for EH-capable devices in accordance with one or more aspects of the present disclosure.

FIG. 14 shows a flowchart illustrating a method 1400 that supports different slot formats and transmission types for EH-capable devices in accordance with aspects of the present disclosure. The operations of the method 1400 may be implemented by a UE or its components as described herein. For example, the operations of the method 1400 may be performed by a UE 115 as described with reference to FIGS. 1 through 9. In some aspects, a UE may execute a set of instructions to control the functional elements of the wireless UE to perform the described functions. Additionally, or alternatively, the wireless UE may perform aspects of the described functions using special-purpose hardware.

At 1405, the method may include receiving, from a first network node, first control information indicative of one or more slot formats which are supported by the first network node for EH-associated communications. The operations of 1405 may be performed in accordance with examples as disclosed herein. In some aspects, aspects of the operations of 1405 may be performed by a EH-associated slot format manager 825 as described with reference to FIG. 8.

At 1410, the method may include transmitting, based on the first control information, second control information to the first network node, where the second control information is indicative of a respective energy cost for the EH-capable device for each respective portion of one or more portions of the one or more slot formats. The operations of 1410 may be performed in accordance with examples as disclosed herein. In some aspects, aspects of the operations of 1410 may be performed by an energy cost manager 830 as described with reference to FIG. 8.

At 1415, the method may include receiving, from the first network node, scheduling information that schedules a shared channel transmission between the EH-capable device and one of the first network node or a second network node, where the scheduling information is based on the second control information. The operations of 1415 may be performed in accordance with examples as disclosed herein. In some aspects, aspects of the operations of 1415 may be performed by a shared channel transmission scheduling manager 835 as described with reference to FIG. 8.

Figure 15:
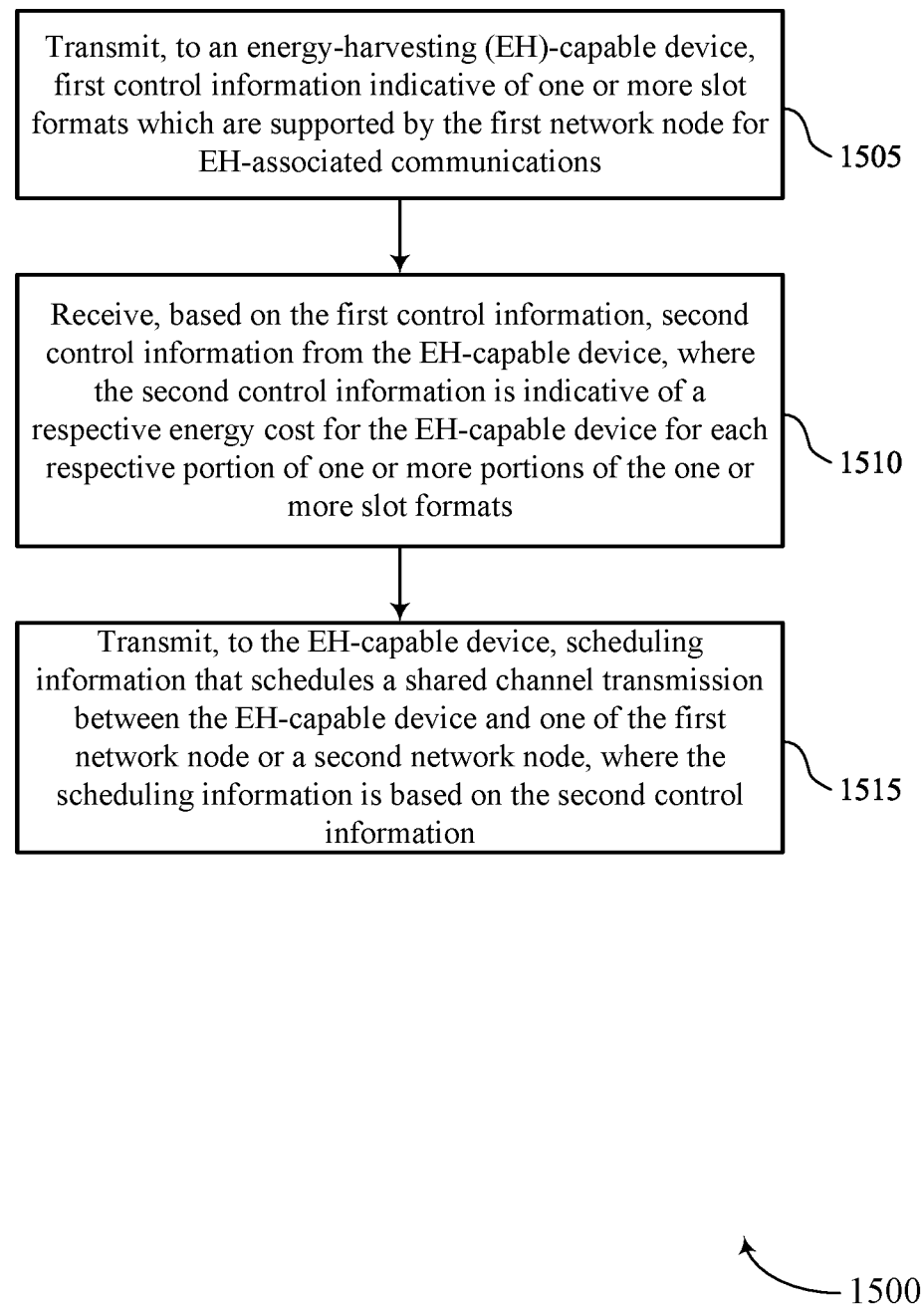

FIG. 15 shows a flowchart illustrating a method 1500 that supports different slot formats and transmission types for EH-capable devices in accordance with aspects of the present disclosure. The operations of the method 1500 may be implemented by a network entity or its components as described herein. For example, the operations of the method 1500 may be performed by a network entity as described with reference to FIGS. 1 through 5 and 10 through 13. In some aspects, a network entity may execute a set of instructions to control the functional elements of the wireless network entity to perform the described functions. Additionally, or alternatively, the wireless network entity may perform aspects of the described functions using special-purpose hardware.

At 1505, the method may include transmitting, to an EH-capable device, first control information indicative of one or more slot formats which are supported by the first network node for EH-associated communications. The operations of 1505 may be performed in accordance with examples as disclosed herein. In some aspects, aspects of the operations of 1505 may be performed by a EH-associated slot format manager 1225 as described with reference to FIG. 12.

At 1510, the method may include receiving, based on the first control information, second control information from the EH-capable device, where the second control information is indicative of a respective energy cost for the EH-capable device for each respective portion of one or more portions of the one or more slot formats. The operations of 1510 may be performed in accordance with examples as disclosed herein. In some aspects, aspects of the operations of 1510 may be performed by an energy cost manager 1230 as described with reference to FIG. 12.

At 1515, the method may include transmitting, to the EH-capable device, scheduling information that schedules a shared channel transmission between the EH-capable device and one of the first network node or a second network node, where the scheduling information is based on the second control information. The operations of 1515 may be performed in accordance with examples as disclosed herein. In some aspects, aspects of the operations of 1515 may be performed by a shared channel transmission scheduling manager 1235 as described with reference to FIG. 12.

The following provides an overview of aspects of the present disclosure:

Aspect 1: A method for wireless communications at an EH-capable device, comprising: receiving, from a first network node, first control information indicative of one or more slot formats which are supported by the first network node for EH-associated communications; transmitting, based on the first control information, second control information to the first network node, wherein the second control information is indicative of a respective energy cost for the EH-capable device for each respective portion of one or more portions of the one or more slot formats; and receiving, from the first network node, scheduling information that schedules a shared channel transmission between the EH-capable device and one of the first network node or a second network node, wherein the scheduling information is based on the second control information.

Aspect 2: The method of aspect 1, wherein the one or more slot formats include a pattern of signal types within a slot or a plurality of slots.

Aspect 3: The method of aspect 2, wherein the signal types include one or more control channel types, one or more reference signal types, one or more data channel types, one or more uplink message types, one or more downlink message types, one or more sidelink message types, or combinations thereof.

Aspect 4: The method of any of aspects 1 through 3, wherein the first control information includes one or more sets of RRC parameters, each set of RRC parameters of the one or more sets of RRC parameters corresponds to one respective slot format of the one or more slot formats, and each set of RRC parameters of the one or more sets of RRC parameters defines a respective reference allocation block size and a respective resource set for the respective slot format to which the respective set of RRC parameters corresponds.

Aspect 5: The method of any of aspects 1 through 4, wherein the shared channel transmission is a downlink transmission or an uplink transmission between the first network node and the EH-capable device.

Aspect 6: The method of any of aspects 1 through 4, wherein the shared channel transmission is a sidelink transmission between the second network node and the EH-capable device.

Aspect 7: The method of aspect 6, wherein the scheduling information includes an indication of a transmission type for the sidelink transmission.

Aspect 8: The method of any of aspects 1 through 7, further comprising: transmitting, to the first network node, third control information indicative of an identifier or a class identifier of the second network node, wherein the second network node is a second EH-capable device; and receiving, from the first network node, fourth control information indicative of one or more second slot formats for the second network node for communications with the EH-capable device.

Aspect 9: The method of any of aspects 1 through 8, further comprising: communicating a second shared channel transmission with the second network node using a particular slot format of one or more second slot formats, wherein the one or more second slot formats are for the second network node for EH associated communications, wherein the second network node is a second EH-capable device, and wherein the particular slot format is based on a second shared channel transmission type that corresponds to an expected communication between the EH-capable device and the second network node.

Aspect 10: The method of aspect 9, further comprising: receiving, from the second network node, third control information indicative of a respective energy cost for each respective portion of one or more portions of the one or more second slot formats.

Aspect 11: The method of aspect 10, further comprising: transmitting, to the first network node, fourth control information indicative of the respective energy cost for each respective portion of the one or more portions of the one or more second slot formats; and receiving, from the first network node, second scheduling information that schedules the second shared channel transmission between the EH-capable device and the second network node, wherein the second scheduling information is based on the fourth control information.

Aspect 12: The method of any of aspects 10 through 11, wherein communicating the second shared channel transmission comprises: communicating the second shared channel transmission using one of the one or more second slot formats based on the third control information indicative of the respective energy cost for each respective portion of the one or more portions of the one or more second slot formats.

Aspect 13: The method of any of aspects 1 through 12, further comprising: communicating, with the first network node, the shared channel transmission using one of the one or more slot formats based on an energy status of the EH-capable device, a charging rate of the EH-capable device, a discharge rate of the EH-capable device, a battery leakage of the EH-capable device or a combination thereof.

Aspect 14: The method of any of aspects 1 through 13, further comprising: transmitting, to the first network node, a scheduling request for a second shared channel transmission between the EH-capable device and one of the first network node or the second network node, wherein the scheduling request is based on an energy level at the EH-capable device being sufficient for communication of the second shared channel transmission.

Aspect 15: The method of any of aspects 1 through 14, further comprising: transmitting, to the first network node, third control information indicative of an energy level at the EH-capable device being sufficient for the shared channel transmission, wherein the scheduling information is responsive to the third control information.

Aspect 16: A method for wireless communications at a first network node, comprising: transmitting, to an EH-capable device, first control information indicative of one or more slot formats which are supported by the first network node for EH-associated communications; receiving, based on the first control information, second control information from the EH-capable device, wherein the second control information is indicative of a respective energy cost for the EH-capable device for each respective portion of one or more portions of the one or more slot formats; and transmitting, to the EH-capable device, scheduling information that schedules a shared channel transmission between the EH-capable device and one of the first network node or a second network node, wherein the scheduling information is based on the second control information.

Aspect 17: The method of aspect 16, wherein the one or more slot formats include a pattern of signal types within a slot or a plurality of slots.

Aspect 18: The method of aspect 17, wherein the signal types include one or more control channel types, one or more reference signal types, one or more data channel types, one or more uplink message types, one or more downlink message types, one or more sidelink message types, or combinations thereof.

Aspect 19: The method of any of aspects 16 through 18, wherein the first control information includes one or more sets of RRC parameters, each set of RRC parameters of the one or more sets of RRC parameters corresponds to one respective slot format of the one or more slot formats, and each set of RRC parameters of the one or more sets of RRC parameters defines a respective reference block allocation size and a respective resource set for the respective slot format to which the respective set of RRC parameters corresponds.

Aspect 20: The method of any of aspects 16 through 19, wherein the shared channel transmission is a downlink transmission or an uplink transmission between the first network node and the EH-capable device.

Aspect 21: The method of any of aspects 16 through 19, wherein the shared channel transmission is a sidelink transmission between the second network node and the EH-capable device.

Aspect 22: The method of any of aspects 16 through 21, further comprising: receiving, from the EH-capable device, third control information indicative of an identifier or a class identifier of the second network node, wherein the second network node is a second EH-capable device; and transmitting, to the EH-capable device, fourth control information indicative of one or more second slot formats for the second network node for communications with the EH-capable device.

Aspect 23: The method of aspect 22, further comprising: receiving, from the EH-capable device, fifth control information indicative of a respective energy cost for the second network node for each respective portion of one or more portions of the one or more second slot formats.

Aspect 24: The method of any of aspects 16 through 23, further comprising: receiving, from the EH-capable device, a scheduling request for a second shared channel transmission between the EH-capable device and one of the first network node or the second network node, wherein the scheduling request is based on an energy level at the EH-capable device being sufficient for communication of the second shared channel transmission.

Aspect 25: The method of any of aspects 16 through 24, further comprising: receive, from the EH-capable device, third control information indicative of an energy level at the EH-capable device being sufficient for the shared channel transmission, wherein the scheduling information is responsive to the third control information.

Aspect 26: An EH-capable device, comprising a memory; and at least one processor coupled to the memory, wherein the at least one processor is configured to perform a method of any of aspects 1 through 15.

Aspect 27: An apparatus for wireless communications at an EH-capable device, comprising at least one means for performing a method of any of aspects 1 through 15.

Aspect 28: A non-transitory computer-readable medium having code for wireless communication stored thereon that, when executed by an EH-capable device, causes the EH-capable device to perform a method of any of aspects 1 through 15.

Aspect 29: A first network node for wireless communications, comprising a memory; and at least one processor coupled to the memory, wherein the at least one processor is configured to perform a method of any of aspects 16 through 25.

Aspect 30: An apparatus for wireless communications at a first network node, comprising at least one means for performing a method of any of aspects 16 through 25.

Aspect 31: A non-transitory computer-readable medium having code for wireless communication stored thereon that, when executed by a first network node, causes the first network node to perform a method of any of aspects 16 through 25.

The methods described herein describe possible implementations, and the operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An energy harvesting (EH)-capable device for wireless communications, comprising:
a memory; and
at least one processor coupled to the memory, wherein the at least one processor is configured to:
receive, from a first network node, first control information indicative of one or more slot formats which are supported by the first network node for EH-associated communications;
transmit, based on the first control information, second control information to the first network node, wherein the second control information is indicative of a respective energy cost for the EH-capable device for each respective portion of one or more portions of the one or more slot formats; and
receive, from the first network node, scheduling information that schedules a shared channel transmission between the EH-capable device and one of the first network node or a second network node, wherein the scheduling information is based on the second control information, wherein the first control information includes one or more sets of radio resource control parameters, wherein each set of radio resource control parameters of the one or more sets of radio resource control parameters corresponds to one respective slot format of the one or more slot formats, and wherein each set of radio resource control parameters of the one or more sets of radio resource control parameters defines a respective reference block allocation size and a respective resource set for the respective slot format to which the respective set of radio resource control parameters corresponds.

2. The EH-capable device of claim 1, wherein the one or more slot formats include a pattern of signal types within a slot or a plurality of slots.

3. The EH-capable device of claim 2, wherein the signal types include one or more control channel types, one or more reference signal types, one or more data channel types, one or more uplink message types, one or more downlink message types, one or more sidelink message types, or combinations thereof.

4. The EH-capable device of claim 1, wherein the shared channel transmission is a downlink transmission or an uplink transmission between the first network node and the EH-capable device.

5. The EH-capable device of claim 1, wherein the shared channel transmission is a sidelink transmission between the second network node and the EH-capable device.

6. The EH-capable device of claim 5, wherein the scheduling information includes an indication of a transmission type for the sidelink transmission.

7. The EH-capable device of claim 1, wherein the at least one processor is configured to:
transmit, to the first network node, third control information indicative of an identifier or a class identifier of the second network node, wherein the second network node is a second EH-capable device; and
receive, from the first network node, fourth control information indicative of one or more second slot formats for the second network node for communications with the EH-capable device.

8. An energy harvesting (EH)-capable device for wireless communications, comprising:
a memory; and
at least one processor coupled to the memory, wherein the at least one processor is configured to:
receive, from a first network node, first control information indicative of one or more slot formats which are supported by the first network node for EH-associated communications;
transmit, based on the first control information, second control information to the first network node, wherein the second control information is indicative of a respective energy cost for the EH-capable device for each respective portion of one or more portions of the one or more slot formats;
receive, from the first network node, scheduling information that schedules a shared channel transmission between the EH-capable device and one of the first network node or a second network node, wherein the scheduling information is based on the second control information; and
communicate a second shared channel transmission with the second network node using a particular slot format of one or more second slot formats, wherein the one or more second slot formats are for the second network node for EH associated communications, wherein the second network node is a second EH-capable device, and wherein the particular slot format is based on a second shared channel transmission type that corresponds to an expected communication between the EH-capable device and the second network node.

9. The EH-capable device of claim 8, wherein the at least one processor is configured to:
receive, from the second network node, third control information indicative of a respective energy cost for each respective portion of one or more portions of the one or more second slot formats.

10. The EH-capable device of claim 9, wherein the at least one processor is configured to:
transmit, to the first network node, fourth control information indicative of the respective energy cost for each respective portion of the one or more portions of the one or more second slot formats; and
receive, from the first network node, second scheduling information that schedules the second shared channel transmission between the EH-capable device and the second network node, wherein the second scheduling information is based on the fourth control information.

11. The EH-capable device of claim 9, wherein to communicate the second shared channel transmission, the at least one processor is configured to:
communicate the second shared channel transmission using one of the one or more second slot formats based on the third control information indicative of the respective energy cost for each respective portion of the one or more portions of the one or more second slot formats.

12. The EH-capable device of claim 1, wherein the at least one processor is configured to:
communicate, with the first network node, the shared channel transmission using one of the one or more slot formats based on an energy status of the EH-capable device, a charging rate of the EH-capable device, a discharge rate of the EH-capable device, a battery leakage of the EH-capable device or a combination thereof.

13. The EH-capable device of claim 1, wherein the at least one processor is configured to:

transmit, to the first network node, a scheduling request for a second shared channel transmission between the EH-capable device and one of the first network node or the second network node, wherein the scheduling request is based on an energy level at the EH-capable device being sufficient for communication of the second shared channel transmission.

14. The EH-capable device of claim 1, wherein the at least one processor is configured to:
transmit, to the first network node, third control information indicative of an energy level at the EH-capable device being sufficient for the shared channel transmission, wherein the scheduling information is responsive to the third control information.

15. A first network node for wireless communications, comprising:
a memory; and
at least one processor coupled to the memory, wherein the at least one processor is configured to:
transmit, to an energy-harvesting (EH)-capable device, first control information indicative of one or more slot formats which are supported by the first network node for EH-associated communications;
receive, based on the first control information, second control information from the EH-capable device, wherein the second control information is indicative of a respective energy cost for the EH-capable device for each respective portion of one or more portions of the one or more slot formats; and
transmit, to the EH-capable device, scheduling information that schedules a shared channel transmission between the EH-capable device and one of the first network node or a second network node, wherein the scheduling information is based on the second control information, wherein the first control information includes one or more sets of radio resource control parameters, wherein each set of radio resource control parameters of the one or more sets of radio resource control parameters corresponds to one respective slot format of the one or more slot formats, and wherein each set of radio resource control parameters of the one or more sets of radio resource control parameters defines a respective reference block allocation size and a respective resource set for the respective slot format to which the respective set of radio resource control parameters corresponds.

16. The first network node of claim 15, wherein the one or more slot formats include a pattern of signal types within a slot or a plurality of slots.

17. The first network node of claim 16, wherein the signal types include one or more control channel types, one or more reference signal types, one or more data channel types, one or more uplink message types, one or more downlink message types, one or more sidelink message types, or combinations thereof.

18. The first network node of claim 15, wherein the shared channel transmission is a downlink transmission or an uplink transmission between the first network node and the EH-capable device.

19. The first network node of claim 15, wherein the shared channel transmission is a sidelink transmission between the second network node and the EH-capable device.

20. The first network node of claim 15, wherein the at least one processor is configured to:
receive, from the EH-capable device, third control information indicative of an identifier or a class identifier of the second network node, wherein the second network node is a second EH-capable device; and
transmit, to the EH-capable device, fourth control information indicative of one or more second slot formats for the second network node for communications with the EH-capable device.

21. The first network node of claim 20, wherein the at least one processor is configured to:
receive, from the EH-capable device, fifth control information indicative of a respective energy cost for the second network node for each respective portion of one or more portions of the one or more second slot formats.

22. The first network node of claim 15, wherein the at least one processor is configured to:
receive, from the EH-capable device, a scheduling request for a second shared channel transmission between the EH-capable device and one of the first network node or the second network node, wherein the scheduling request is based on an energy level at the EH-capable device being sufficient for communication of the second shared channel transmission.

23. The first network node of claim 15, wherein the at least one processor is configured to:
receive, from the EH-capable device, third control information indicative of an energy level at the EH-capable device being sufficient for the shared channel transmission, wherein the scheduling information is responsive to the third control information.

24. A method for wireless communications at an energy harvesting (EH)-capable device, comprising:
receiving, from a first network node, first control information indicative of one or more slot formats which are supported by the first network node for EH-associated communications;
transmitting, based on the first control information, second control information to the first network node, wherein the second control information is indicative of a respective energy cost for the EH-capable device for each respective portion of one or more portions of the one or more slot formats; and
receiving, from the first network node, scheduling information that schedules a shared channel transmission between the EH-capable device and one of the first network node or a second network node, wherein the scheduling information is based on the second control information, wherein the first control information includes one or more sets of radio resource control parameters, wherein each set of radio resource control parameters of the one or more sets of radio resource control parameters corresponds to one respective slot format of the one or more slot formats, and wherein each set of radio resource control parameters of the one or more sets of radio resource control parameters defines a respective reference block allocation size and a respective resource set for the respective slot format to which the respective set of radio resource control parameters corresponds.

25. The method of claim 24, wherein the one or more slot formats include a pattern of signal types within a slot or a plurality of slots.

26. The method of claim 25, wherein the signal types include one or more control channel types, one or more reference signal types, one or more data channel types, one or more uplink message types, one or more downlink message types, one or more sidelink message types, or combinations thereof.

* * * * *